US008877054B2

(12) United States Patent
Andersen et al.

(10) Patent No.: US 8,877,054 B2
(45) Date of Patent: Nov. 4, 2014

(54) HIGH CAPACITY SUCTION STRAINER FOR AN EMERGENCY CORE COOLING SYSTEM IN A NUCLEAR POWER PLANT

(75) Inventors: Charles Andersen, Kildeer, IL (US); Edward Wolbert, Lisle, IL (US); Nicholas Hawkins, Chicago, IL (US)

(73) Assignee: Transco Products Inc., Chicago, IL (US)

( * ) Notice: Subject to any disclaimer, the term of this patent is extended or adjusted under 35 U.S.C. 154(b) by 0 days.

(21) Appl. No.: 14/122,551

(22) PCT Filed: May 9, 2012

(86) PCT No.: PCT/US2012/037019
§ 371 (c)(1),
(2), (4) Date: Feb. 26, 2014

(87) PCT Pub. No.: WO2012/166307
PCT Pub. Date: Dec. 6, 2012

(65) Prior Publication Data
US 2014/0197091 A1    Jul. 17, 2014

Related U.S. Application Data

(60) Provisional application No. 61/492,258, filed on Jun. 1, 2011, provisional application No. 61/537,988, filed on Sep. 22, 2011.

(51) Int. Cl.
| B01D 35/02 | (2006.01) |
| B01D 25/02 | (2006.01) |
| B01D 29/52 | (2006.01) |
| B01D 29/58 | (2006.01) |
| G21C 15/18 | (2006.01) |

(52) U.S. Cl.
USPC ........ 210/232; 210/323.2; 210/346; 210/486; 210/315; 210/337; 376/282; 376/313

(58) Field of Classification Search
None
See application file for complete search history.

(56) References Cited

U.S. PATENT DOCUMENTS

| 2,000,490 | A |   | 5/1935 | Mandahl |
| 2,910,183 | A |   | 10/1959 | Hayes |
| 3,935,105 | A | * | 1/1976 | McEwen ........................ 210/138 |
| 4,361,183 | A |   | 11/1982 | Ware et al. |
| 4,376,091 | A | * | 3/1983 | Netkowicz et al. ........... 376/283 |
| 5,094,802 | A |   | 3/1992 | Riordan, III |
| 5,230,796 | A | * | 7/1993 | Ter Meulen ................ 210/321.8 |
| 5,243,632 | A | * | 9/1993 | Badin et al. .................... 376/313 |

(Continued)

FOREIGN PATENT DOCUMENTS

EP    1559467 A1    8/2005

OTHER PUBLICATIONS

Transco Products Inc., International Search Report for PCT/US2012/037019 mailed Jul. 19, 2012 by the United States Patent and Trademark Office in its capacity of International Searching Authority.

Primary Examiner — Robert James Popovics
(74) Attorney, Agent, or Firm — Ungaretti & Harris LLP

(57) ABSTRACT

A high capacity suction strainer for a nuclear reactor has a frame, a flow-through plenum, and a filter array. The flow-through plenum is mechanically mounted to the frame and has a plurality of inlets and an outlet. The filter array is also mechanically mounted to the frame and has a plurality of filter groupings in fluid communication with the inlet on the plenum.

16 Claims, 30 Drawing Sheets

(56) References Cited

U.S. PATENT DOCUMENTS

| | | | |
|---|---|---|---|
| 5,478,469 A * | 12/1995 | Bryan et al. | 210/232 |
| 5,687,763 A | 11/1997 | Steinke | |
| 5,688,402 A | 11/1997 | Green et al. | |
| 5,696,801 A | 12/1997 | Dwyer et al. | |
| 5,748,694 A | 5/1998 | King | |
| 5,759,398 A * | 6/1998 | Kielbowicz | 210/416.1 |
| 5,759,399 A * | 6/1998 | Bilanin et al. | 210/416.1 |
| 5,835,549 A | 11/1998 | Sibiga | |
| 5,843,314 A | 12/1998 | Dwyer et al. | |
| D406,316 S | 3/1999 | Rao et al. | |
| 5,935,439 A | 8/1999 | Hart et al. | |
| 5,958,234 A | 9/1999 | Dwyer et al. | |
| 6,103,118 A * | 8/2000 | Ter Meulen | 210/321.79 |
| RE36,984 E | 12/2000 | Steinke | |
| 6,256,851 B1 | 7/2001 | Goedelmann et al. | |
| 6,325,928 B1 * | 12/2001 | Pedersen et al. | 210/232 |
| 6,477,220 B1 * | 11/2002 | Wivagg | 376/282 |
| 6,491,818 B2 * | 12/2002 | Dwyer et al. | 210/315 |
| D468,797 S | 1/2003 | Norton | |
| D476,058 S | 6/2003 | Norton | |
| 6,702,941 B1 | 3/2004 | Haq et al. | |
| 6,709,586 B2 * | 3/2004 | Mason | 210/237 |
| 6,790,360 B1 * | 9/2004 | Pedersen et al. | 210/636 |
| 7,211,190 B2 * | 5/2007 | Kielbowicz | 210/232 |
| 7,438,812 B2 | 10/2008 | Denton et al. | |
| 7,488,426 B1 * | 2/2009 | Zaiter | 210/767 |
| 7,788,867 B2 * | 9/2010 | Oates et al. | 52/302.1 |
| 7,822,164 B1 * | 10/2010 | Kielbowicz | 376/313 |
| 7,848,475 B2 * | 12/2010 | Kaufman et al. | 376/282 |
| 8,048,319 B2 * | 11/2011 | Smith et al. | 210/767 |
| 8,054,932 B2 * | 11/2011 | Smith et al. | 376/282 |
| 8,382,981 B2 * | 2/2013 | Rogers et al. | 210/323.1 |
| 8,475,659 B2 * | 7/2013 | Oh et al. | 210/232 |
| 8,663,469 B2 * | 3/2014 | Kim et al. | 210/232 |
| 8,771,509 B2 * | 7/2014 | Huang et al. | 210/237 |
| 2002/0148766 A1 * | 10/2002 | Dwyer et al. | 210/315 |
| 2003/0164342 A1 * | 9/2003 | Mason | 210/798 |
| 2005/0167355 A1 * | 8/2005 | Kielbowicz | 210/416.1 |
| 2006/0027492 A1 | 2/2006 | Lin | |
| 2006/0075697 A1 | 4/2006 | Oates et al. | |
| 2006/0219645 A1 * | 10/2006 | Bilanin et al. | 210/791 |
| 2007/0045166 A1 * | 3/2007 | Fanning et al. | 210/330 |
| 2007/0084782 A1 | 4/2007 | Smith et al. | |
| 2007/0138072 A1 * | 6/2007 | Bilannin | 210/153 |
| 2007/0267340 A1 | 11/2007 | Bleigh et al. | |
| 2008/0156712 A1 * | 7/2008 | Rhodes et al. | 210/137 |
| 2008/0223779 A1 * | 9/2008 | Kaufman et al. | 210/416.1 |
| 2009/0184064 A1 * | 7/2009 | Zaiter | 210/767 |
| 2010/0025315 A1 * | 2/2010 | Smith et al. | 210/232 |
| 2010/0059129 A1 | 3/2010 | Hamer et al. | |
| 2011/0084008 A1 | 4/2011 | Kielbowicz et al. | |
| 2011/0084009 A1 | 4/2011 | Kielbowicz et al. | |
| 2011/0127209 A1 * | 6/2011 | Rogers et al. | 210/322 |
| 2011/0215059 A1 * | 9/2011 | Smith et al. | 210/806 |
| 2011/0297627 A1 * | 12/2011 | Oh et al. | 210/806 |
| 2012/0037559 A1 * | 2/2012 | Kim et al. | 210/323.2 |
| 2012/0037572 A1 * | 2/2012 | Kim et al. | 210/767 |
| 2012/0273407 A1 * | 11/2012 | Haque et al. | 210/335 |
| 2013/0208847 A1 * | 8/2013 | Prather et al. | 376/309 |
| 2013/0256236 A1 * | 10/2013 | Huang et al. | 210/744 |
| 2014/0064429 A1 * | 3/2014 | Bleigh | 376/313 |
| 2014/0175106 A1 * | 6/2014 | Loewen et al. | 220/745 |
| 2014/0197091 A1 * | 7/2014 | Andersen et al. | 210/323.2 |

* cited by examiner

US 8,877,054 B2

HIGH CAPACITY SUCTION STRAINER FOR AN EMERGENCY CORE COOLING SYSTEM IN A NUCLEAR POWER PLANT

CROSS-REFERENCE TO RELATED APPLICATIONS

This application claims priority to currently U.S. Provisional Patent Application No. 61/492,258 filed Jun. 1, 2011 and 61/537,988 filed Sep. 22, 2011, which are hereby incorporated by reference as if fully set forth herein.

FEDERALLY SPONSORED RESEARCH OR DEVELOPMENT

N/A

TECHNICAL FIELD

The invention relates to a suction strainer for use on suction lines. More particularly, the invention relates to a suction strainer for use in an emergency core cooling system of a nuclear power plant.

BACKGROUND OF THE INVENTION

All nuclear power plants have some form of emergency core cooling system (ECCS) in the event that normal operation is lost and a major break occurs in the reactor cooling system. There are two phases to most ECCS—The injection phase when the pumps suction water from a large tank and pump that water into the reactor cooling system or reactor, and the recirculation phase when the pumps take water from the containment sump after all of the water has been pumped into the containment.

An ECCS has one major function and that is to provide makeup water to cool the reactor in the event of a loss of coolant from the reactor cooling system. This cooling is needed to remove the decay heat still in the reactor's fuel after the reactor is shutdown. ECCS in some plants may have a second major function and that is to provide chemicals to the reactor and reactor cooling system to ensure the reactor does not produce power.

The major components of an ECCS are water supplies (tanks), pumps, interconnecting piping, high pressure pumps, low pressure pumps, water storage tanks, accumulators, and a containment sump used to circulate the water through the reactor once the storage tanks are empty.

In a nuclear reactor, a suction strainer is located in the containment area and its purpose is to keep loose materials and debris, such as insulation, from getting to the suction of the ECCS pumps during the recirculation phase. The pumps perform an important and vital function at nuclear power plants. Again, a purpose of the strainers is to protect the downstream components, such as pumps and nuclear fuel assemblies, from being adversely affected by such debris. Suction strainers, by their nature, have a tendency to build up debris layers. In use, as water is circulated through the strainer, solid debris builds on the outer surfaces of the strainer. The recirculation continues until the ECCS is no longer needed in cold shutdown.

Structural considerations, hydrodynamic loading, and space constraints limit the size and shape of suction strainers in nuclear containment buildings.

One existing suction strainer design utilizes nested tubes which are produced from a perforated metal sheet. Ends of the sheet are butted together and welded to form a tube. In the nuclear power industry welding is highly regulated. It is, therefore, advantageous to reduce or eliminate welding in any nuclear application.

The present invention is provided to solve the problems discussed above and other problems, and to provide advantages and aspects not provided by prior strainers of this type. A full discussion of the features and advantages of the present invention is deferred to the following detailed description, which proceeds with reference to the accompanying drawings.

SUMMARY OF THE INVENTION

One aspect of the present invention is directed to a high capacity suction strainer for an emergency core cooling system in a nuclear power plant. The high capacity suction strainer comprises a frame, a flow-through plenum, and a filter array. The flow-through plenum is mechanically mounted to the frame and comprises a plurality of inlets and an outlet. The filter array is also mechanically mounted to the frame and comprises a plurality of filter groupings. Each filter grouping is in fluid communication with a corresponding inlet on the plenum.

This aspect of the present invention may include one or more of the following a additional features, alone or in any reasonable combination. Each filter grouping may comprise a plurality of nested tubes. Each nested tube may comprise an inner perforated tube disposed within a corresponding outer perforated tube such that an interstitial space is created between the inner and outer perforated tubes. The nested tubes may be arranged in a plurality of columns and rows and extend outwardly from the plenum such that each nested tube has a nested tube outlet forming a fluid communication between each interstitial space and an inlet on the plenum. Each filter grouping may comprise a flow-through top plate. Each filter grouping may comprise a flow-through bottom plate. Each filter grouping may comprise a plurality of top grates located at a proximal end of the nested tubes. Each flow-through top plate may comprise a plurality of top grates located at a proximal end of the nested tubes. Each flow-through bottom plate may comprise a plurality of bottom grates located at a distal end of the nested tubes. The plurality of top grates may comprise a first top grate comprising a plurality of first apertures corresponding in size and shape to the outer circumference of each outer perforated tube wherein a proximal end of each outer perforated tube is inserted within and supported by a corresponding first aperture and a plurality of second apertures located between and about the first apertures to allow a fluid flow therethrough. The plurality of top grates may comprise a second top grate comprising a plurality of first apertures aligned with the first apertures in the first top grate, each having a smaller cross-sectional area than an opening at the proximal end of the outer perforated tube such that the interstitial space between the inner and outer tubes is at least substantially sealed against a surface of the second grate and such that a proximal end of each inner perforated tube is inserted within and supported by a corresponding first aperture, and a plurality of second apertures aligned with the second apertures on the first top grate and located between and about the first apertures to allow a fluid flow therethrough. The plurality of top grates may comprise a third top grate comprising a plurality of first apertures aligned with the first apertures in the second top grate, each having a smaller cross-sectional area than an opening at the proximal end of the inner perforated tube such that the proximal end of the inner perforated tube abuts a surface of the third top grate forming the nested tube inlet, and a plurality of second apertures aligned with the second apertures on the second top grate and located between and about the first apertures to allow a fluid flow therethrough. The plurality of bottom grates may comprise a first bottom grate comprising a plurality of first apertures corresponding in size and shape to the outer circumference of each outer perforated tube wherein a distal end of each outer perforated tube is inserted within and supported by a corresponding first aperture. The plurality of bottom grates may further comprise a second bottom grate comprising a plurality of first apertures, each aligned with a corresponding interstitial space between an inner perforated tube and an outer perforated tube, a plurality of second apertures, each aligned with an opening at a distal end of a corresponding inner perforated tube forming the nested tube outlet aligned with an inlet on the plenum, a central webbing about each second aperture substantially sealing the opening at the distal end of the corresponding inner perforated tube, and a plurality of mechanical fasteners, each fastener passing through a corresponding second aperture and engaging the distal end of the corresponding inner perforated tube to maintain the corresponding inner perforated tube in a desired position in the nested tube. The first top grate and the third top grate may sandwich the second top grate therebetween such that surfaces of the first top grate and the third top grate engage opposite surfaces of the second top grate. The first top grate, the second top grate, and the third top grate may be mechanically attached to the frame. The first bottom grate and a surface of the plenum may sandwich the second bottom grate therebetween such that surfaces of the first bottom grate and the plenum engage opposite surfaces of the second bottom grate. The first bottom grate and the second bottom grate may be mechanically attached to the frame. Each top plate may be mechanically joined to a corresponding bottom plate by a tie rod and each top plate may be separated from the corresponding bottom plate by the plurality of nested tubes. Each top plate may be mechanically joined to a corresponding bottom plate by a pair of cross members joined to the top plate by a mechanical fastener and to the corresponding bottom plate at an opposing end by a mechanical fastener. Each filter grouping maybe attached to the flow-through plenum by a mechanical fastener. Each top plate may be mechanically joined to a corresponding bottom plate by a tie rod and each top plate may be separated from the corresponding bottom plate by the plurality of nested tubes. The interstitial spaces between the inner perforated tubes and the outer perforated tubes may be adapted to receive a filtered fluid flow as a contaminated fluid passes from outer surfaces to inner surfaces of the outer perforated tubes and from inner surfaces to outer surfaces of the inner perforated tubes. The bottom plates may be adapted to act as outlets feeding a filtered fluid to the inlets on the flow-through plenum. The nested tubes may be oriented between 0 degrees and 90 degrees relative to an upper surface of a fluid in a containment area. The nested tubes may be substantially vertically oriented relative to an upper surface of a fluid in a containment area. The nested tubes are substantially horizontally oriented relative to an upper surface of a fluid in a containment area.

Another aspect of the present invention is directed to a high capacity suction strainer for an emergency core cooling system in a nuclear power plant. The high capacity suction strainer comprises a frame, a flow-through plenum, and a filter array. The flow-through plenum is mounted to the frame and comprises a plurality of inlets and an outlet. A filter array is also mounted to the frame and comprises a plurality of filter groupings. Each filter grouping has a plurality of nested tubes. Each nested tube comprises a cylindrical inner perforated tube formed from a metal sheet having complimentary mechanically formed seaming members formed along opposing edge portions wherein the cylindrical inner perforated tube is formed by interlocking the complimentary mechanically formed seaming members to form a mechanical seam. The cylindrical inner perforated tube is disposed within a corresponding cylindrical outer perforated tube such that an interstitial space is created between the inner and outer perforated tubes. The cylindrical outer perforated tube is also formed from a metal sheet having complimentary mechanically formed seaming members formed along opposing edge portions wherein the cylindrical outer perforated tube is formed by interlocking the complimentary mechanically formed seaming members to form a mechanical seam.

This aspect may include one or more of the following features, alone or in any reasonable combination. The mechanical seam of the cylindrical inner perforated tube may form a helical structure winding about a longitudinal length of the cylindrical inner perforated tube. The mechanical seam of the cylindrical outer perforated tube may form a helical structure winding about a longitudinal length of the cylindrical outer perforated tube. The nested tubes are arranged in a plurality of columns and rows and extend outwardly from the plenum such that each nested tube has a nested tube outlet forming a fluid communication between each interstitial space and an inlet on the flow-through plenum. The high capacity suction strainer may further comprise a flow-through top plate comprising a plurality of top grates and a flow-through bottom plate comprising a plurality of bottom grate located opposite the plurality of top grates relative to the nested tubes. The plurality of top grates may comprise a first top grate comprising a plurality of first apertures corresponding in size and shape to the outer circumference of each cylindrical outer perforated tube wherein a proximal end of each cylindrical outer perforated tube is inserted within and supported by a corresponding first aperture and a plurality of second apertures located between and about the first apertures to allow a fluid flow therethrough. The plurality of top grates may comprise a second top grate comprising a plurality of first apertures aligned with the first apertures in the first top grate, each having a smaller cross-sectional area than an opening at the proximal end of the cylindrical outer perforated tube such that the interstitial space between the inner and outer tubes is at least substantially sealed against a surface of the second grate and such that a proximal end of each cylindrical inner perforated tube is inserted within and supported by a corresponding first aperture, and a plurality of second apertures aligned with the second apertures on the first top grate and located between and about the first apertures to allow a fluid flow therethrough. The plurality of top grates may comprise a third top grate comprising a plurality of first apertures aligned with the first apertures in the second top grate, each having a smaller cross-sectional area than an opening at the proximal end of the cylindrical inner perforated tube such that the proximal end of the cylindrical inner perforated tube abuts a surface of the third top grate forming the nested tube inlet, and a plurality of second apertures aligned with the second apertures on the second top grate and located between and about the first apertures to allow a fluid flow therethrough. The first top grate and the third top grate may sandwich the second top grate therebetween such that surfaces of the first top grate and the third top grate engage opposite surfaces of the second top grate. The first top grate, the second top grate, and the third top grate may be mechanically attached to the frame. The plurality of bottom grates may comprise a first bottom grate comprising a plurality of first apertures corresponding in size and shape to the outer circumference of each cylindrical outer perforated tube wherein a distal end of each cylindrical outer perforated tube is inserted within and supported by a corresponding first aperture. The plurality of bottom grates may comprise a second bottom grate comprising a plurality of first apertures, each aligned with a corresponding interstitial space between a cylindrical inner perforated tube and a cylindrical outer perforated tube, a plurality of second apertures, each aligned with an opening at a distal end of a corresponding cylindrical inner perforated tube forming the nested tube outlet aligned with an inlet on the plenum, a central webbing about each second aperture substantially sealing the opening at the distal end of the corresponding cylindrical inner perforated tube, and a plurality of mechanical fasteners, each fastener passing through a corresponding second aperture and engaging the distal end of the corresponding cylindrical inner perforated tube to maintain the corresponding cylindrical inner perforated tube in a desired position in the nested tube. The first bottom grate and a surface of the plenum may sandwich the second bottom grate therebetween such that surfaces of the first bottom grate and the plenum engage opposite surfaces of the second bottom grate. The first bottom grate and the second bottom grate may be mechanically attached to the frame.

Another aspect of the present invention is directed to a high capacity suction strainer for an emergency core cooling system in a nuclear power plant. This suction strainer comprises a flow-through plenum comprising an inlet and an outlet and a filter array. The filter array comprises a plurality of nested tubes, each comprising an inner perforated tube disposed within a corresponding outer perforated tube such that an interstitial space is created between the inner and outer perforated tubes, the inner and outer tubes comprising a radially extending slot adjacent to a radially extending segment of the inner and outer tubes wherein the radially extending slot and the radially extending segment extend in an identical radial direction relative to a center axis of the inner and outer tubes.

Another aspect of the present invention is directed to a high capacity suction strainer for an emergency core cooling system in a nuclear power plant. This suction strainer comprises a flow-through plenum comprising an inlet and an outlet and a filter array. The filter array comprises a plurality of nested tubes, each comprising an inner perforated tube disposed within a corresponding outer perforated tube such that an interstitial space is created between the inner and outer perforated tubes, the inner and outer tubes comprising a helical mechanically-formed seam extending a length of each tube.

Another aspect of the present invention is directed to a high capacity suction strainer for an emergency core cooling system in a nuclear power plant. This suction strainer comprises a flow-through plenum comprising an inlet and an outlet and a filter array. The filter array comprises a plurality of nested tubes. Each comprises an inner perforated tube disposed within a corresponding outer perforated tube such that an interstitial space is created between the inner and outer perforated tubes. The inner and outer tubes comprise a plurality of radially extending slots adjacent to a corresponding plurality of radially extending segments of the inner and outer tubes. The plurality of radially extending slots form a first helical pattern having a first orientation about a surface of the inner and outer tubes and a second helical pattern having a second orientation opposite the first orientation about the surface of the inner and outer tubes.

Another aspect of the present invention is directed to a high capacity suction strainer for an emergency core cooling system in a nuclear power plant. This suction strainer comprises a flow-through plenum comprising an inlet and an outlet and a filter array. The filter array comprises a plurality of nested tubes. Each comprises an inner perforated tube disposed within a corresponding outer perforated tube such that an interstitial space is created between the inner and outer perforated tubes. The inner and outer tubes comprise a radially extending slot adjacent to a radially extending segment of the inner and outer tubes wherein the radially extending slot and the radially extending segment extend in an identical radial direction relative to a center axis of the inner and outer tubes.

The previous four aspects of the present invention may include one or more of the following features, alone or in any reasonable combination. The nested tubes may be arranged in a plurality of columns and rows and extend outwardly from the plenum such that each nested tube has a nested tube outlet forming a fluid communication between each interstitial space and an inlet on the plenum wherein the filter array forms a filter grouping and the high capacity suction strainer comprises a plurality of filter groupings. Each filter grouping may comprise a flow-through top plate. Each filter grouping may comprise a flow-through bottom plate. Each filter grouping may comprise a plurality of top grates located at a proximal end of the nested tubes. Each flow-through top plate may comprise a plurality of top grates located at a proximal end of the nested tubes. Each flow-through bottom plate may comprise a plurality of bottom grates located at a distal end of the nested tubes. The plurality of top grates may comprise a first top grate comprising a plurality of first apertures corresponding in size and shape to the outer circumference of each outer perforated tube wherein a proximal end of each outer perforated tube is inserted within and supported by a corresponding first aperture and a plurality of second apertures located between and about the first apertures to allow a fluid flow therethrough. The plurality of top grates may comprise a second top grate comprising a plurality of first apertures aligned with the first apertures in the first top grate, each having a smaller cross-sectional area than an opening at the proximal end of the outer perforated tube such that the interstitial space between the inner and outer tubes is at least substantially sealed against a surface of the second grate and such that a proximal end of each inner perforated tube is inserted within and supported by a corresponding first aperture, and a plurality of second apertures aligned with the second apertures on the first top grate and located between and about the first apertures to allow a fluid flow therethrough. The plurality of top grates may comprise a third top grate comprising a plurality of first apertures aligned with the first apertures in the second top grate, each having a smaller cross-sectional area than an opening at the proximal end of the inner perforated tube such that the proximal end of the inner perforated tube abuts a surface of the third top grate forming the nested tube inlet, and a plurality of second apertures aligned with the second apertures on the second top grate and located between and about the first apertures to allow a fluid flow therethrough. The plurality of bottom grates may comprise a first bottom grate comprising a plurality of first apertures corresponding in size and shape to the outer circumference of each outer perforated tube wherein a distal end of each outer perforated tube is inserted within and supported by a corresponding first aperture. The plurality of bottom grates may comprise a second bottom grate comprising a plurality of first apertures, each aligned with a corresponding interstitial space between an inner perforated tube and an outer perforated tube, a plurality of second apertures, each aligned with an opening at a distal end of a corresponding inner perforated tube forming the nested tube outlet aligned with an inlet on the plenum, a central webbing about each second aperture substantially sealing the opening at the distal end of the corresponding inner perforated tube, and a plurality of mechanical fasteners, each fastener passing through a corresponding second aperture and engaging the distal end of the corresponding inner perforated tube to maintain the corresponding inner perforated tube in a desired position in the nested tube. The first top grate and the third top grate may sandwich the second top grate therebetween such that surfaces of the first top grate and the third top grate engage opposite surfaces of the second top grate. The first top grate, the second top grate, and the third top grate may be mechanically attached to the frame. The first bottom grate and a surface of the plenum may sandwich the second bottom grate therebetween such that surfaces of the first bottom grate and the plenum engage opposite surfaces of the second bottom grate. The first bottom grate and the second bottom grate may be mechanically attached to the frame. Each top plate may be mechanically joined to a corresponding bottom plate by a tie rod and each top plate may be separated from the corresponding bottom plate by the plurality of nested tubes. Each top plate may be mechanically joined to a corresponding bottom plate by a pair of cross members joined to the top plate by a mechanical fastener and to the corresponding bottom plate at an opposing end by a mechanical fastener. Each filter grouping may be attached to the flow-through plenum by a mechanical fastener. Each top plate may be mechanically joined to a corresponding bottom plate by a tie rod and each top plate may be separated from the corresponding bottom plate by the plurality of nested tubes. The interstitial spaces between the inner perforated tubes and the outer perforated tubes may be adapted to receive a filtered fluid flow as a contaminated fluid passes from outer surfaces to inner surfaces of the outer perforated tubes and from inner surfaces to outer surfaces of the inner perforated tubes. The bottom plates may be adapted to act as outlets feeding a filtered fluid to the inlets on the flow-through plenum.

Another aspect of the present invention is directed to a high capacity suction strainer for an emergency core cooling system in a nuclear power plant as shown and described.

Another aspect of the present invention is directed to a filter array for a high capacity suction strainer for an emergency core cooling system in a nuclear power plant as shown and described.

Another aspect of the present invention is directed to a filter grouping for a high capacity suction strainer for an emergency core cooling system in a nuclear power plant as shown and described.

BRIEF DESCRIPTION OF THE DRAWINGS

To understand the present invention, it will now be described by way of example, with reference to the accompanying drawings in which.

DETAILED DESCRIPTION

Figure 1:
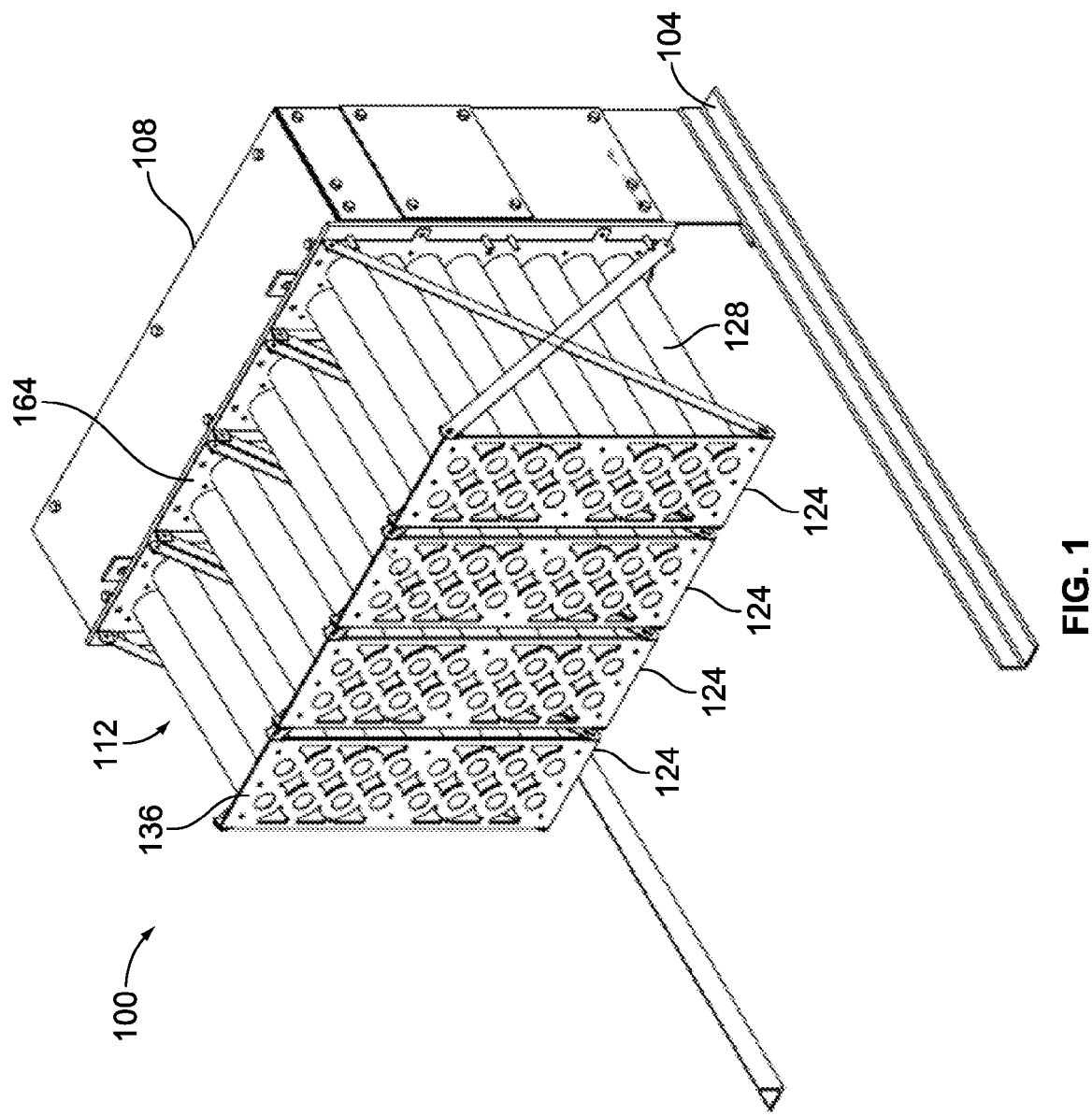
FIG. 1 is isometric view of a strainer of the present invention.
Figure 2:
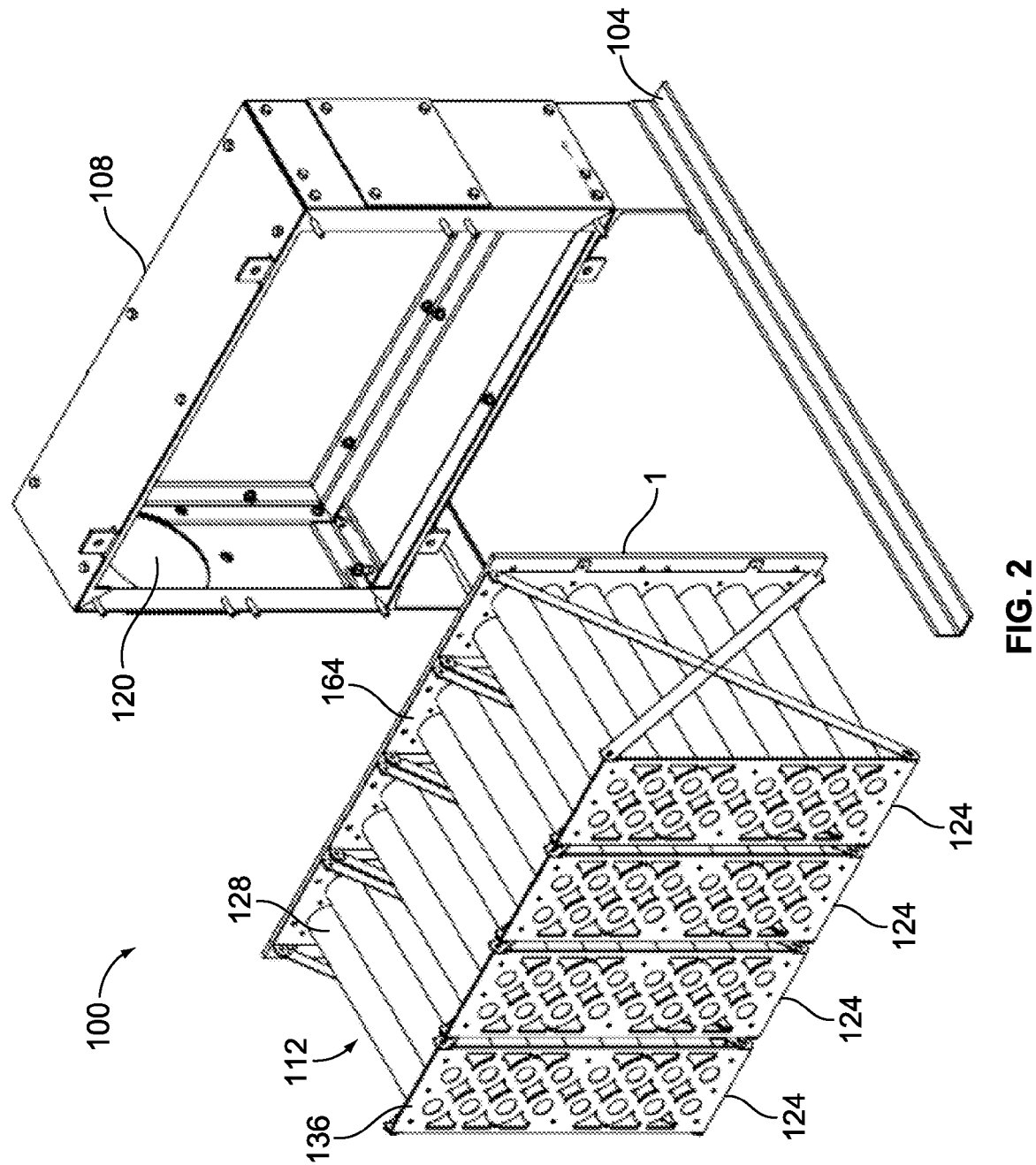
FIG. 2 is a partially exploded view of the strainer of FIG. 1.
Figure 3:
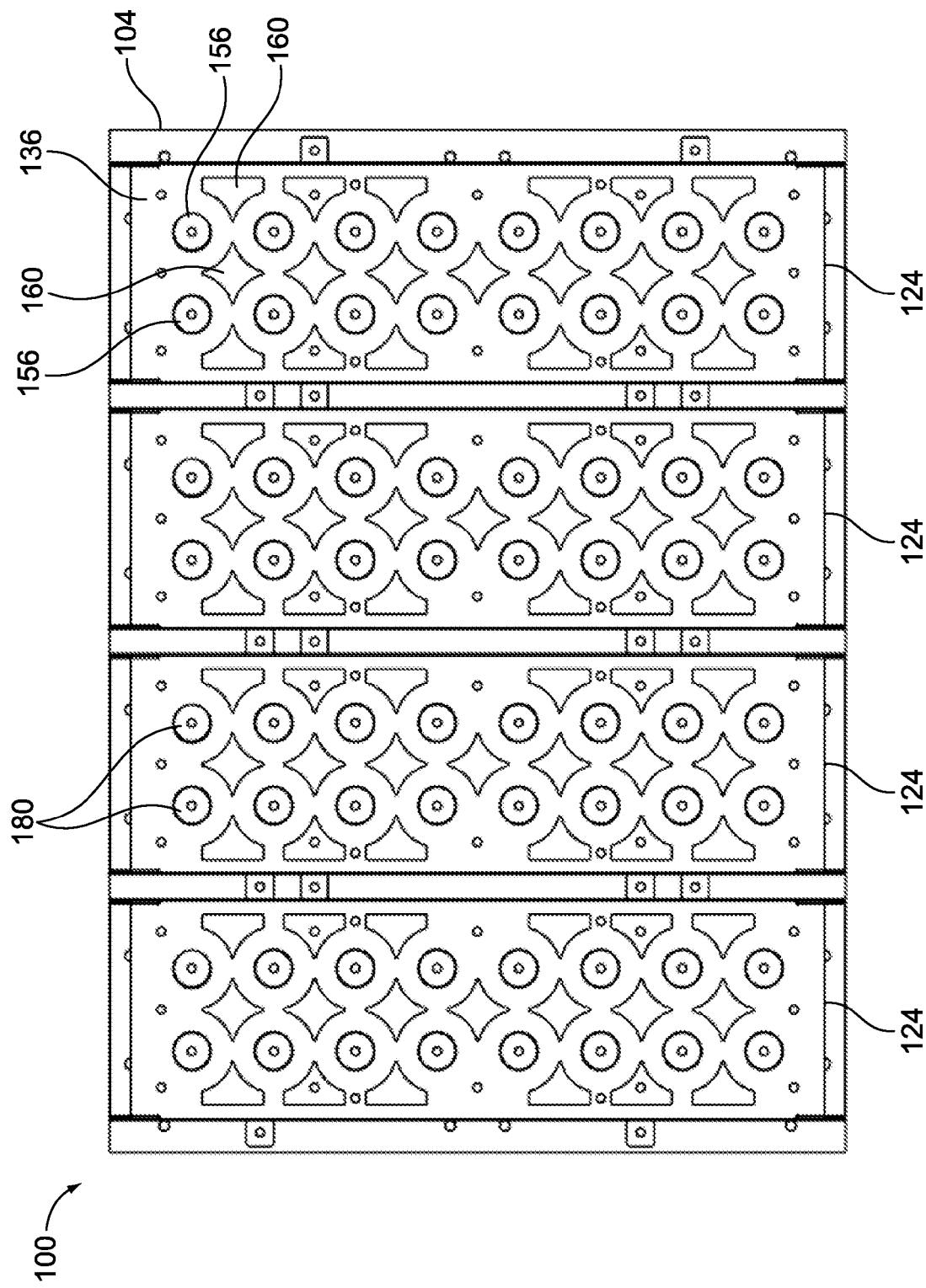
FIG. 3 is a top view of the strainer of FIG. 2.
Figure 4:
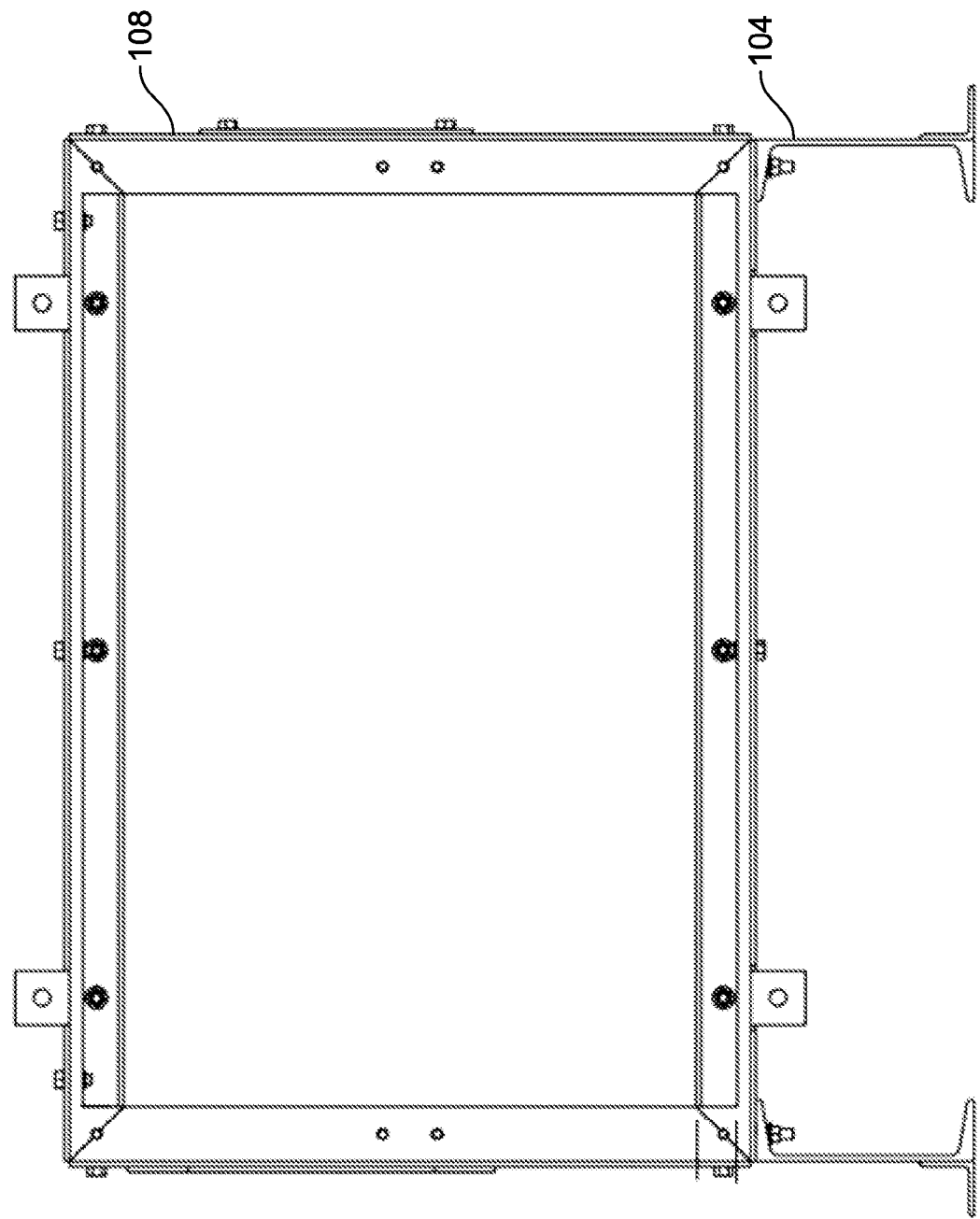
FIG. 4 is a top view of a strainer plenum.
Figure 7:
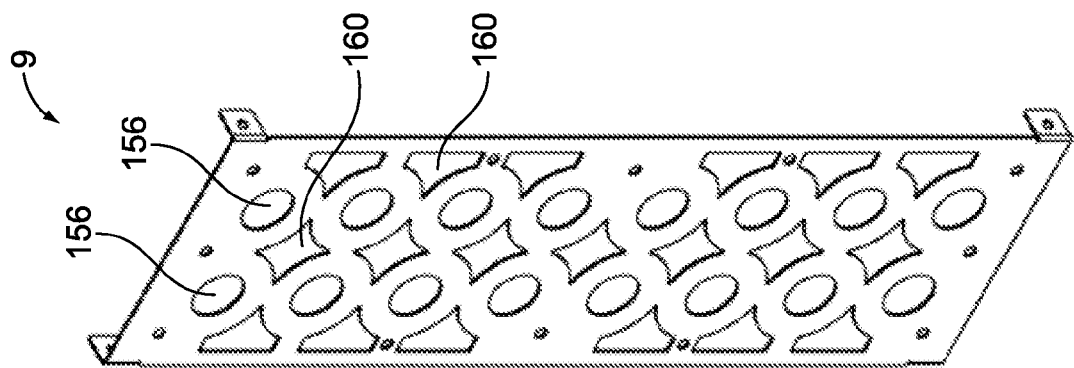
FIG. 7 is an isometric view of a third top grate.
Figure 6:
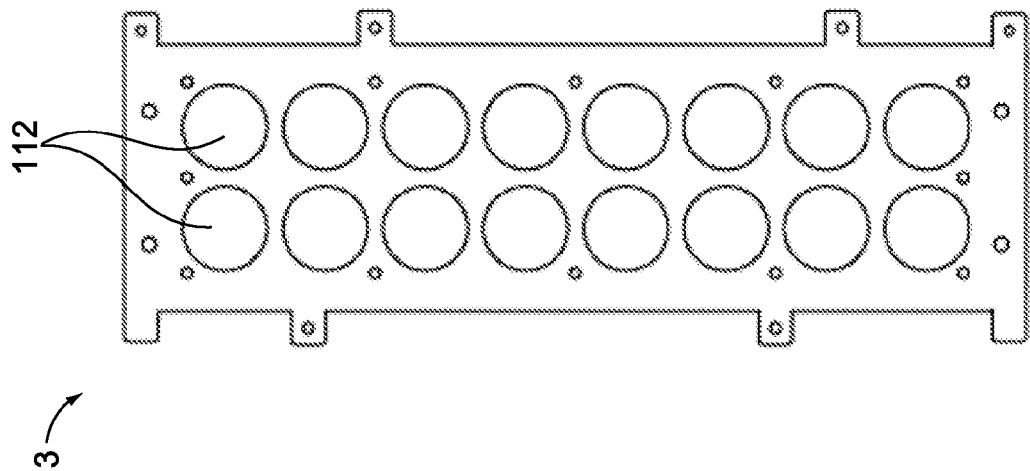
FIG. 6 is a plan view of the first bottom grate of FIG. 5.
Figure 5:
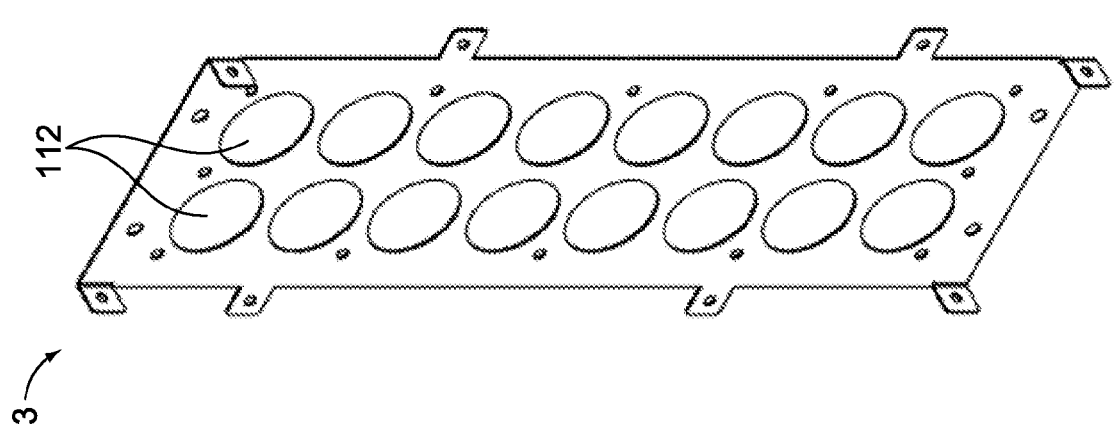
FIG. 5 is a rear isometric view of a first bottom grate.
Figure 8:
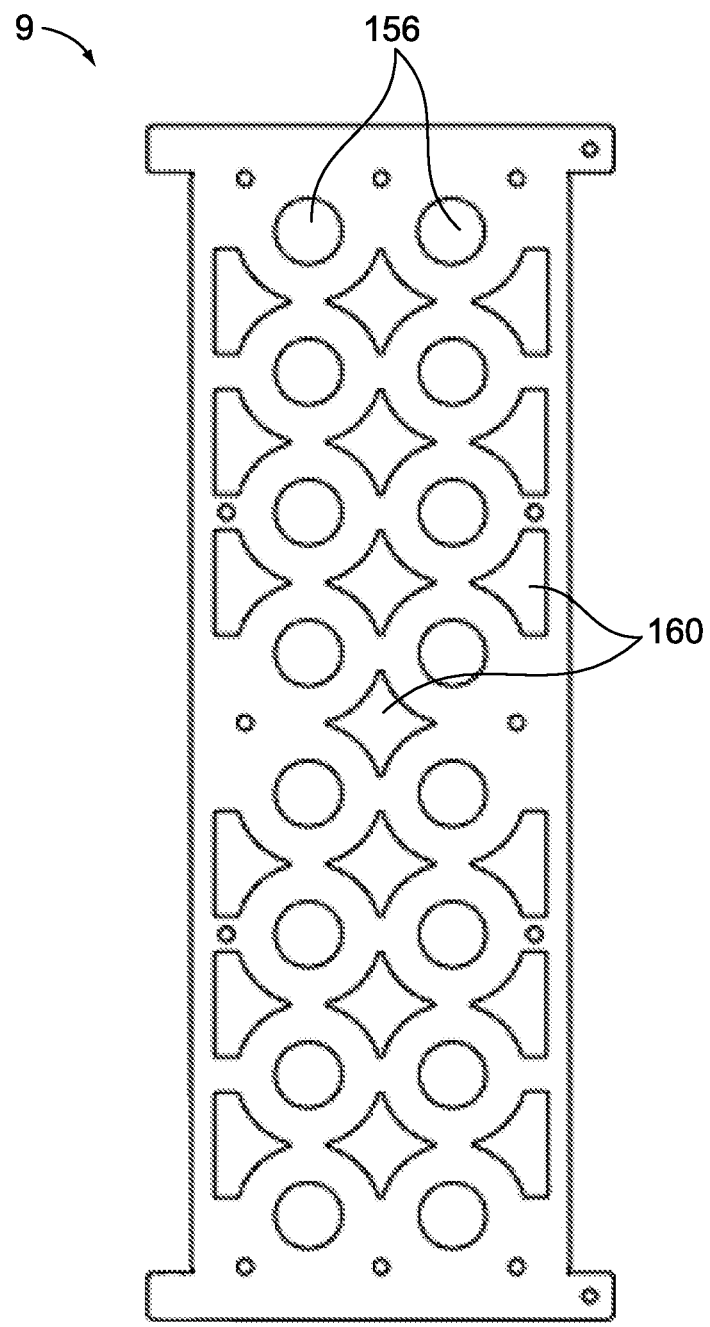
FIG. 8 is a plan view of the third top grate of FIG. 7.
Figure 9:
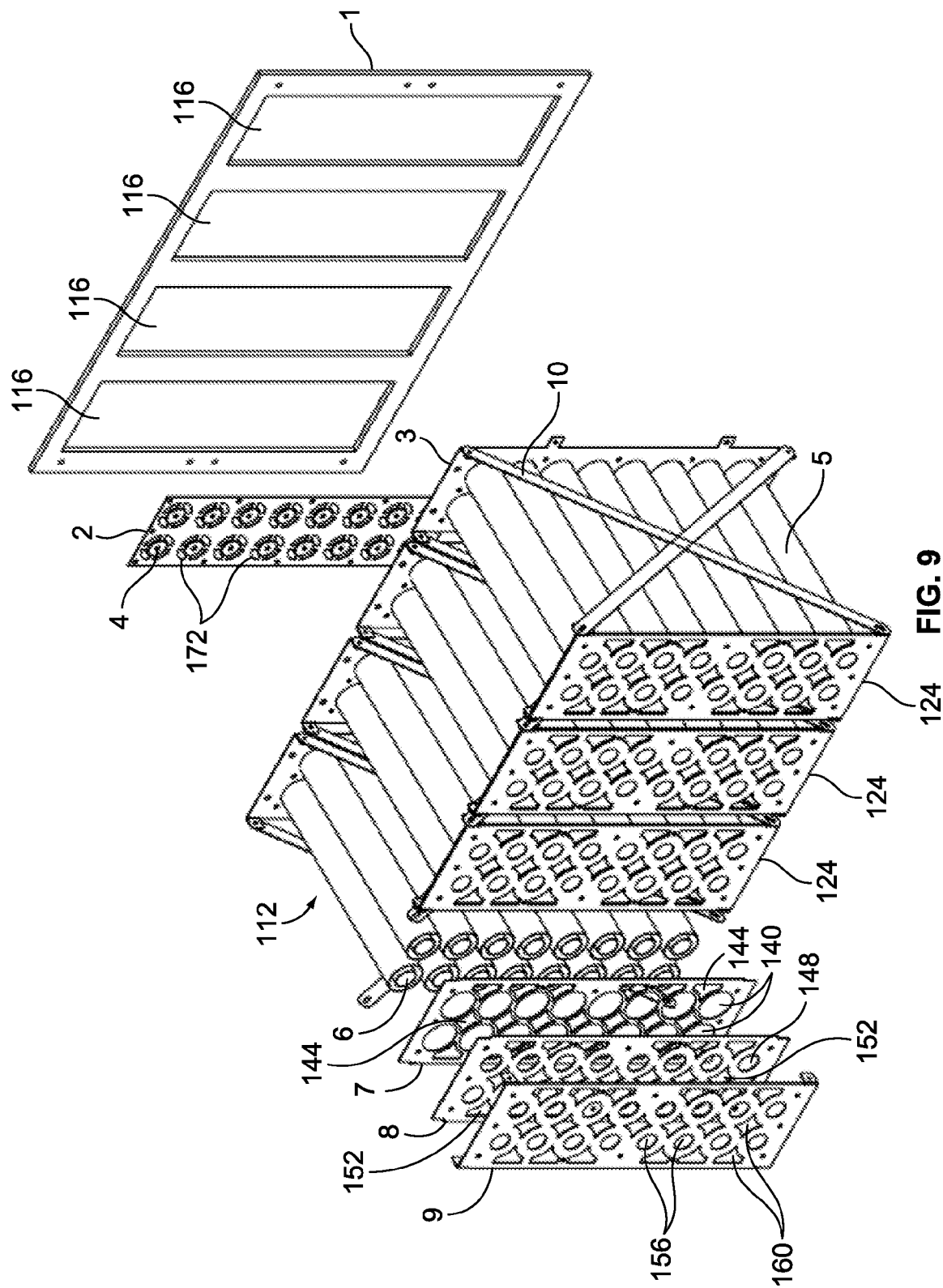
FIG. 9 is an exploded view of a strainer of the present invention.
Figure 10:
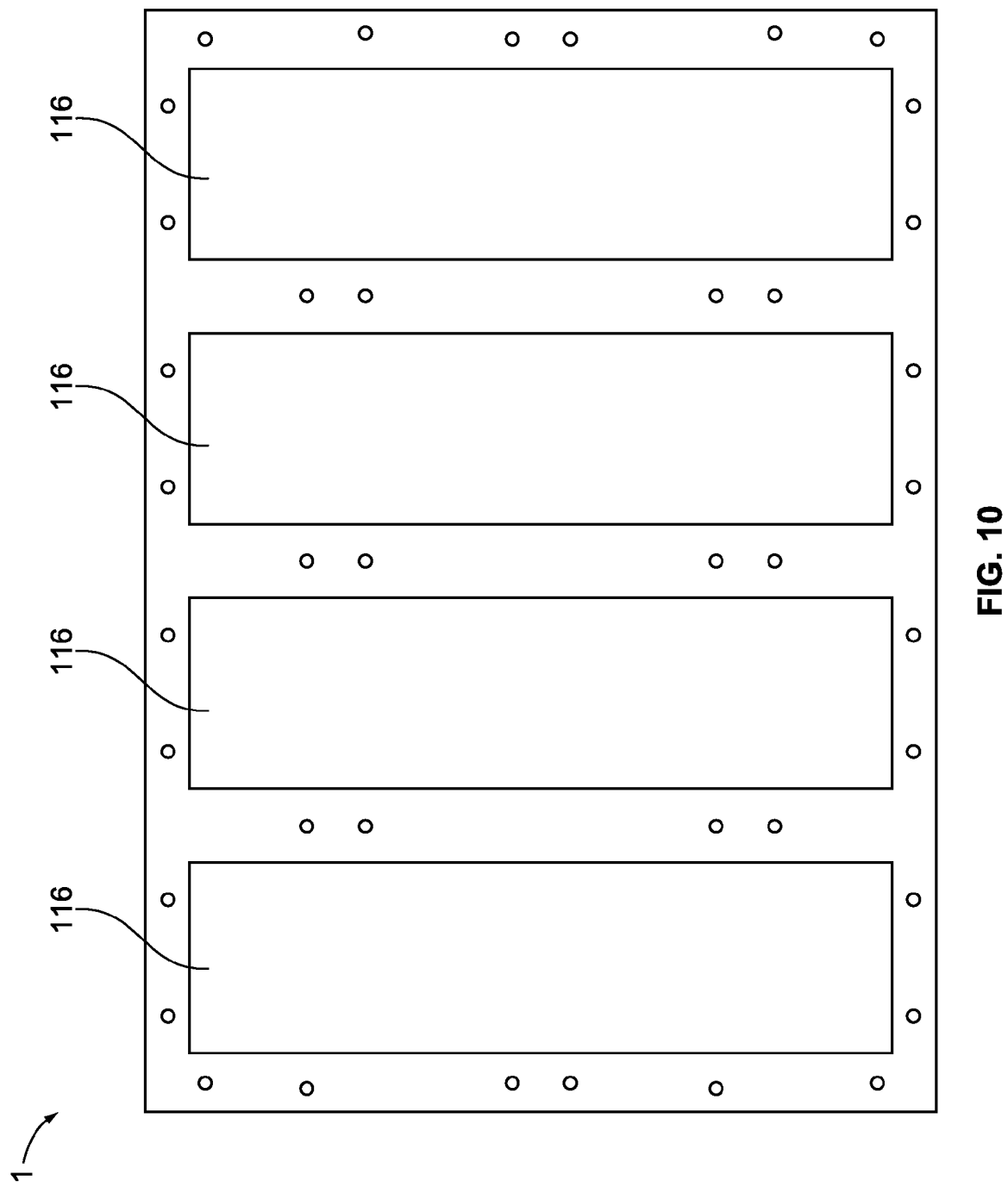
FIG. 10 is a plan view of a template plate.
Figure 11:
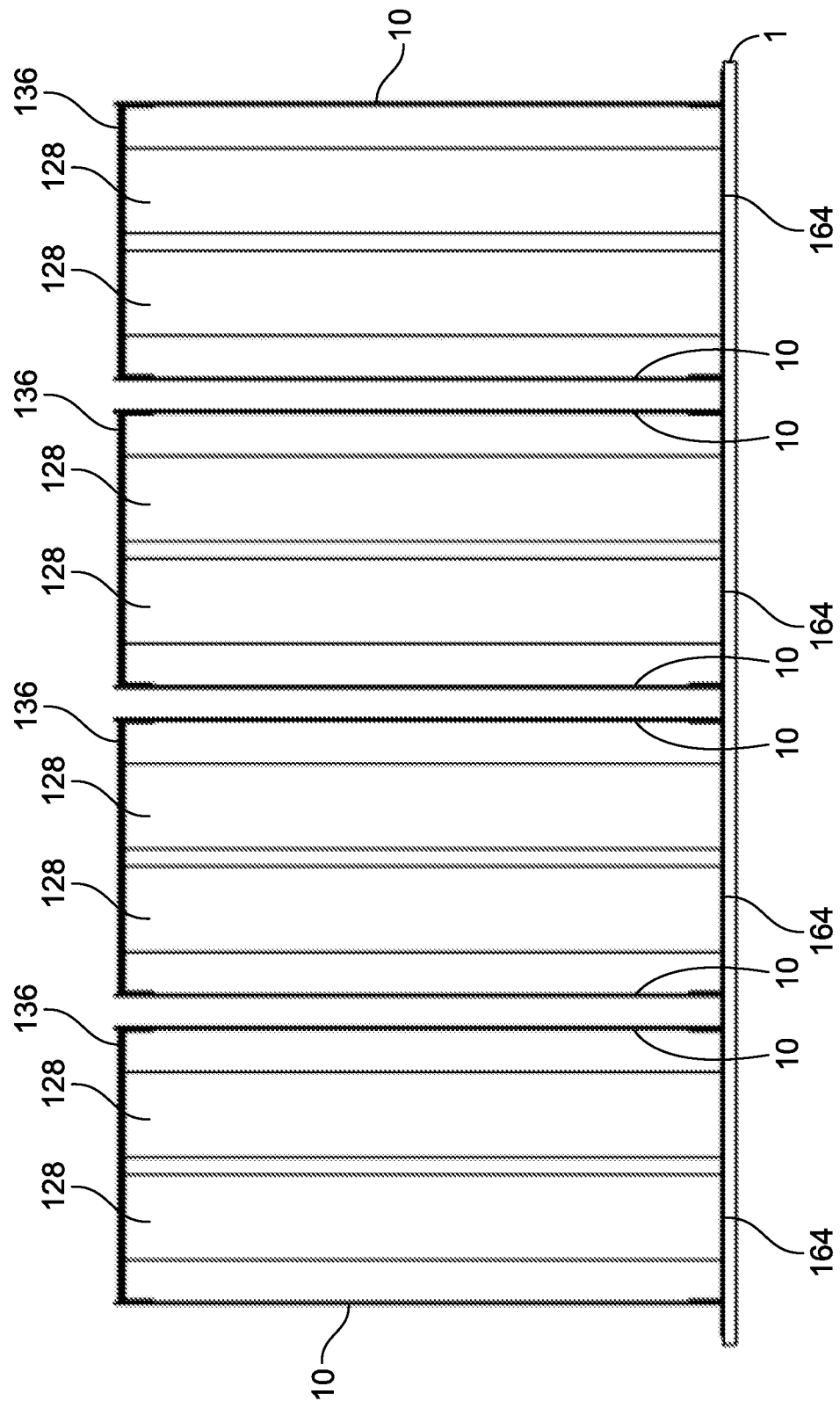
FIG. 11 is a side view of a strainer of the present invention.
Figure 12:
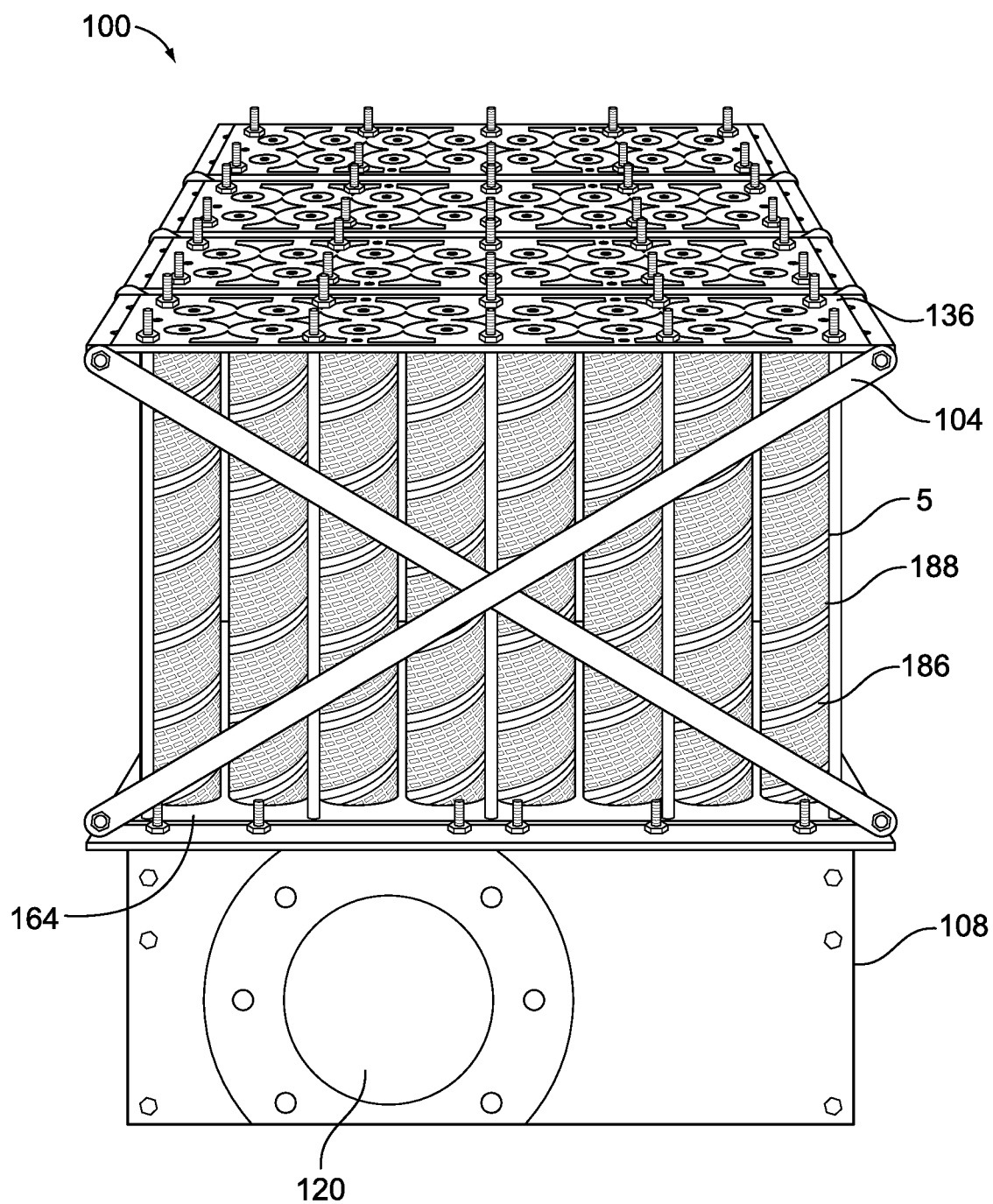
FIG. 12 is a perspective view of an embodiment of a strainer of the present invention.
Figure 13:
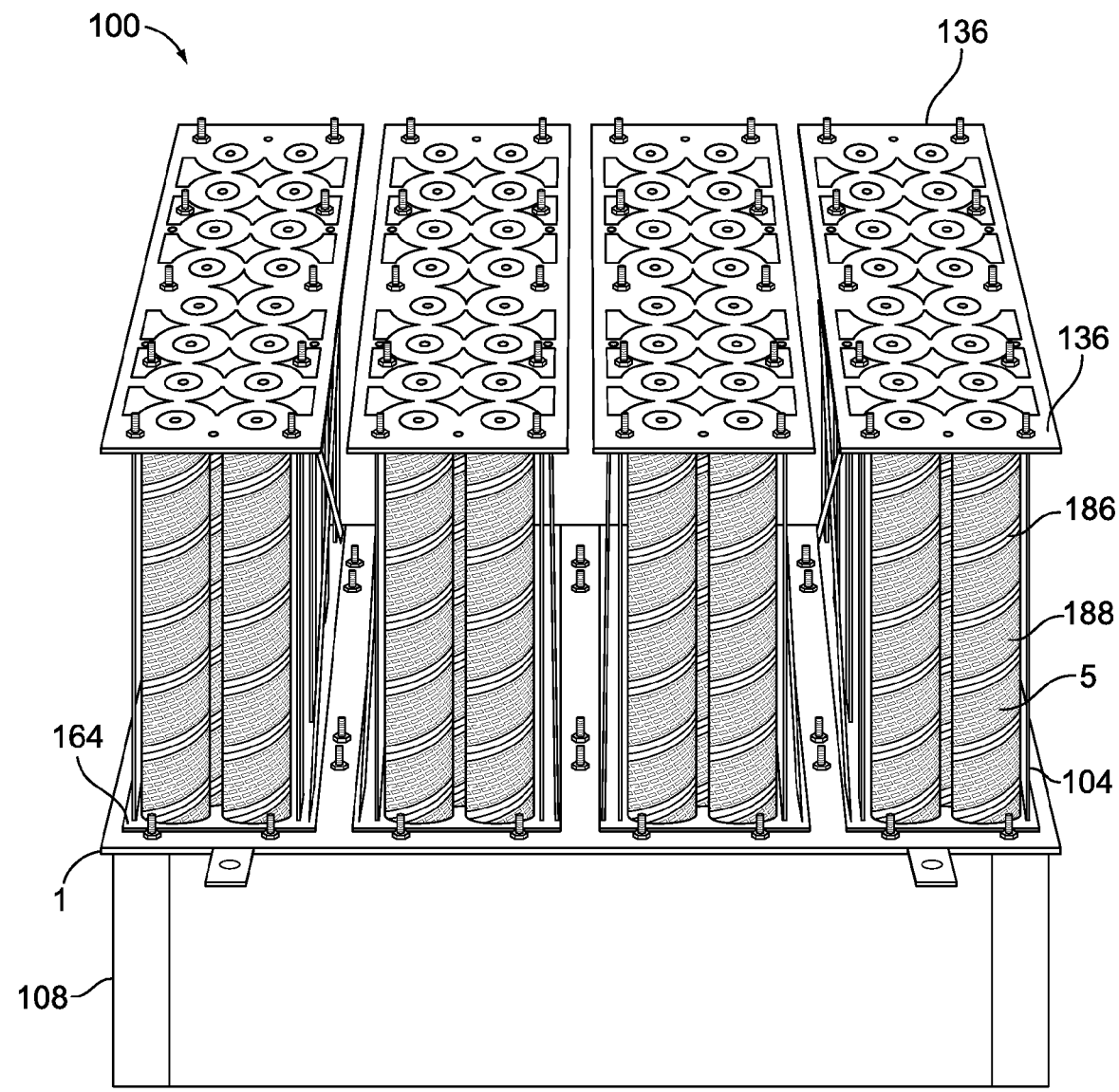
FIG. 13 is a perspective view of the strainer of FIG. 12.
Figure 14:
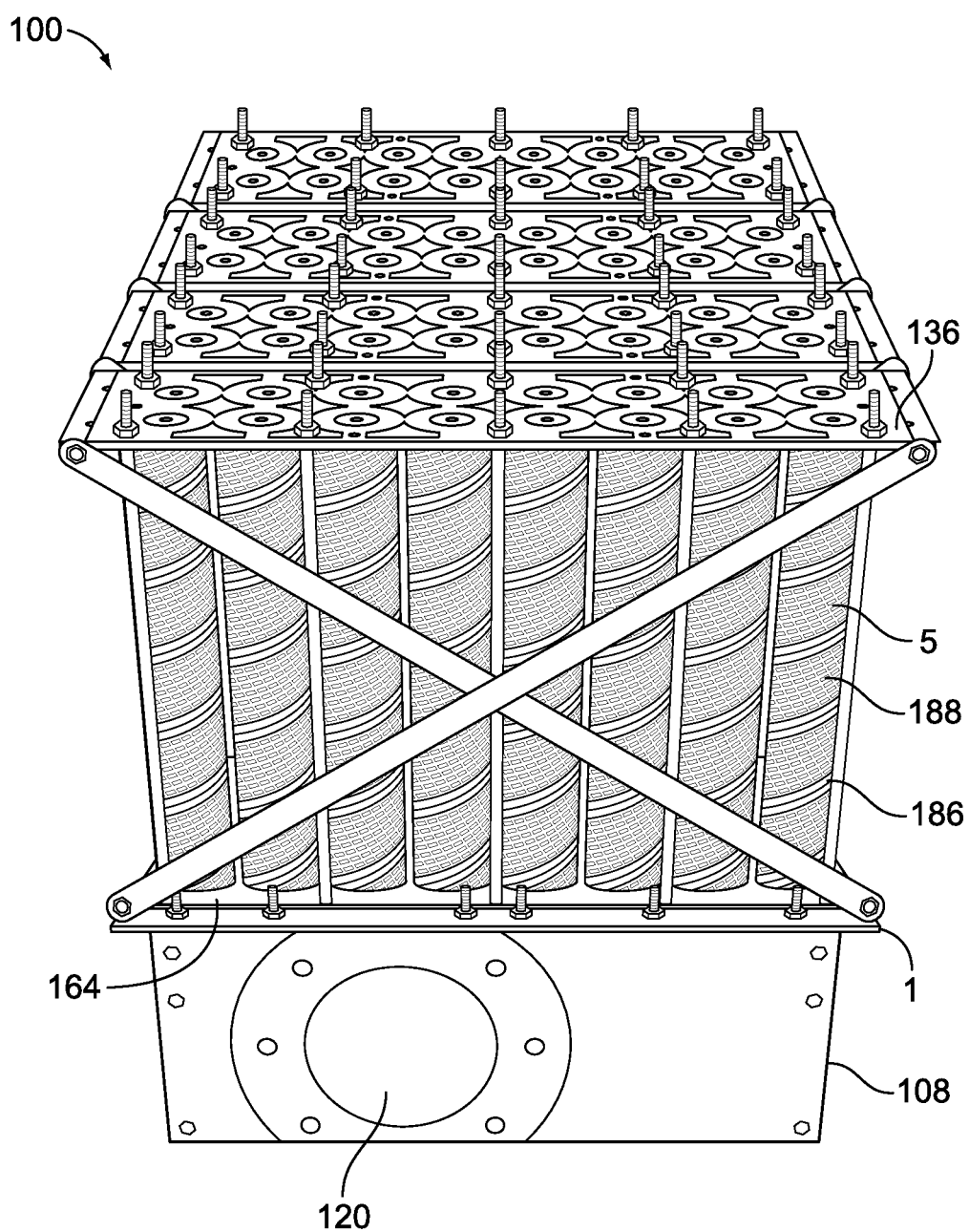
FIG. 14 is a perspective view of the strainer of FIG. 12.
Figure 15:
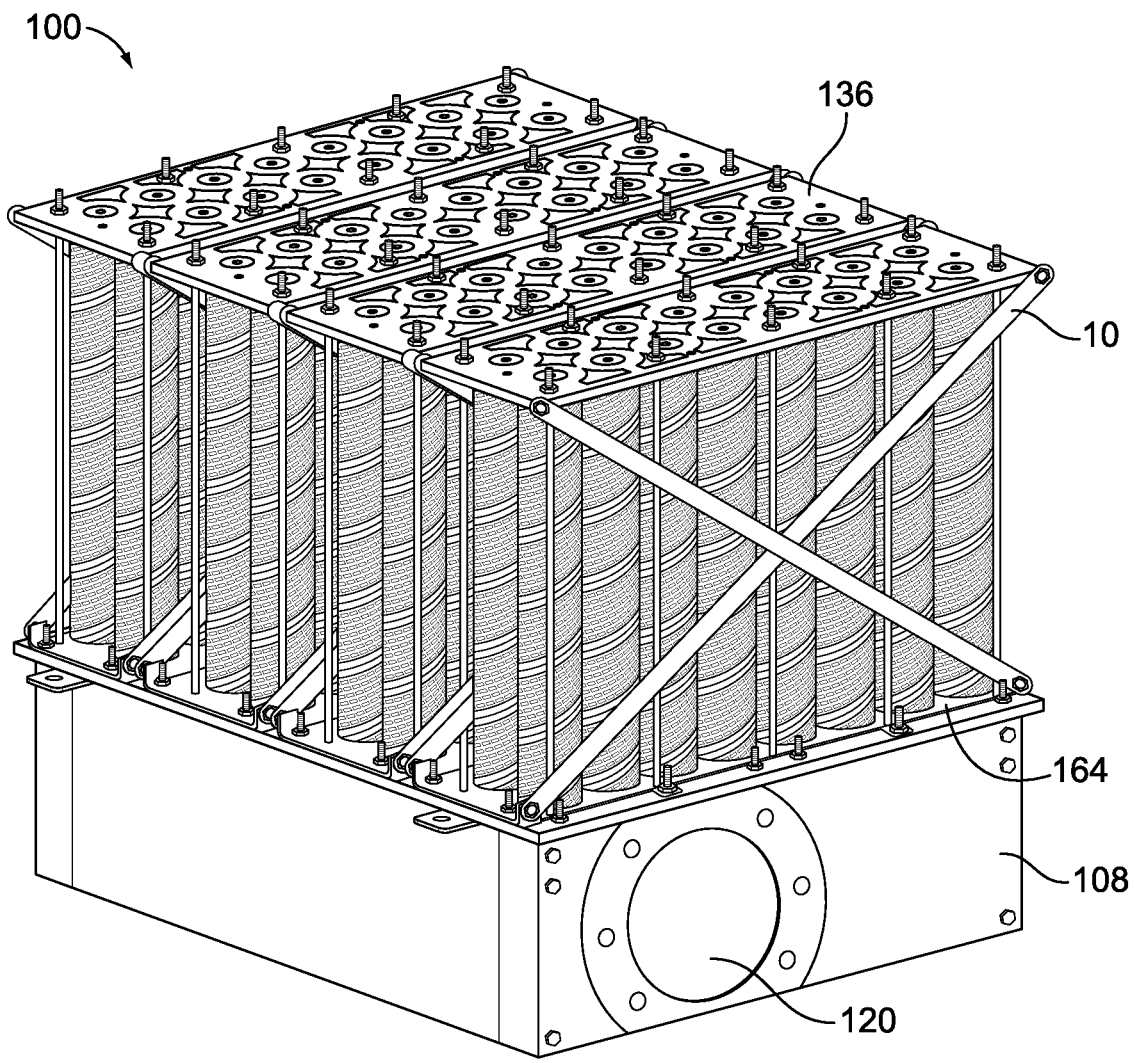
FIG. 15 is a perspective view of the strainer of FIG. 12.
Figure 16:
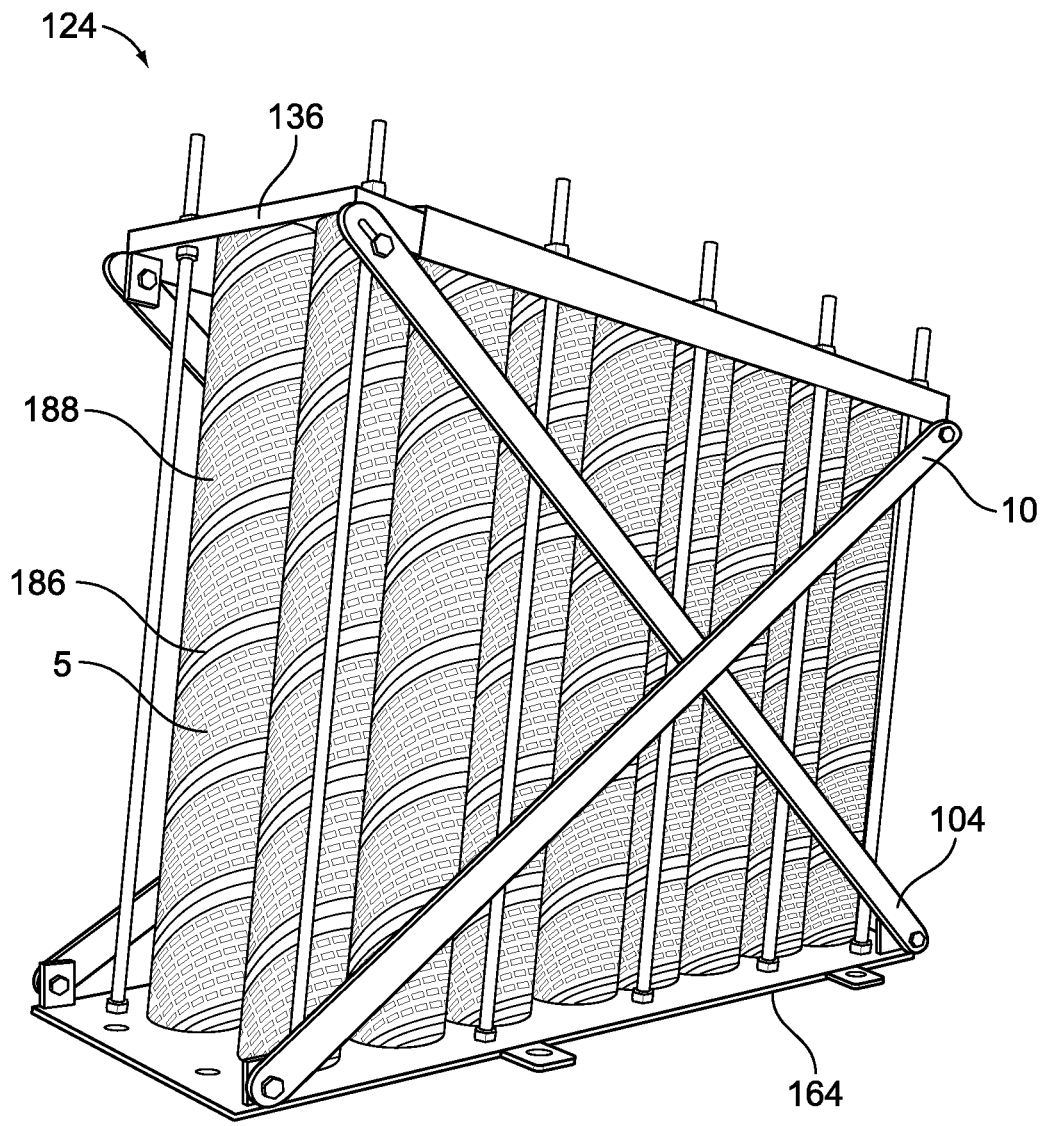
FIG. 16 is a perspective view of a filter grouping provided with a strainer of then present invention.
Figure 17:
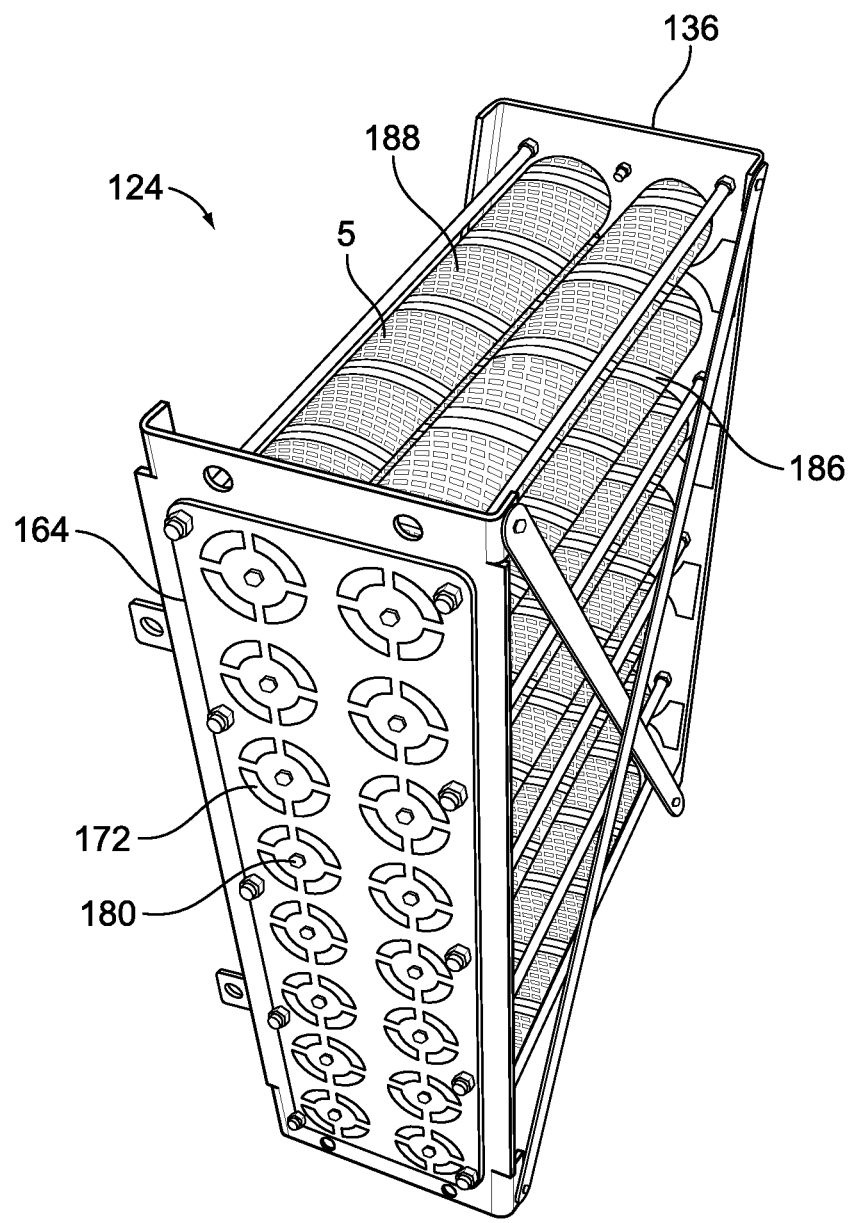
FIG. 17 is a perspective view of the filter grouping of FIG. 16.
Figure 18:
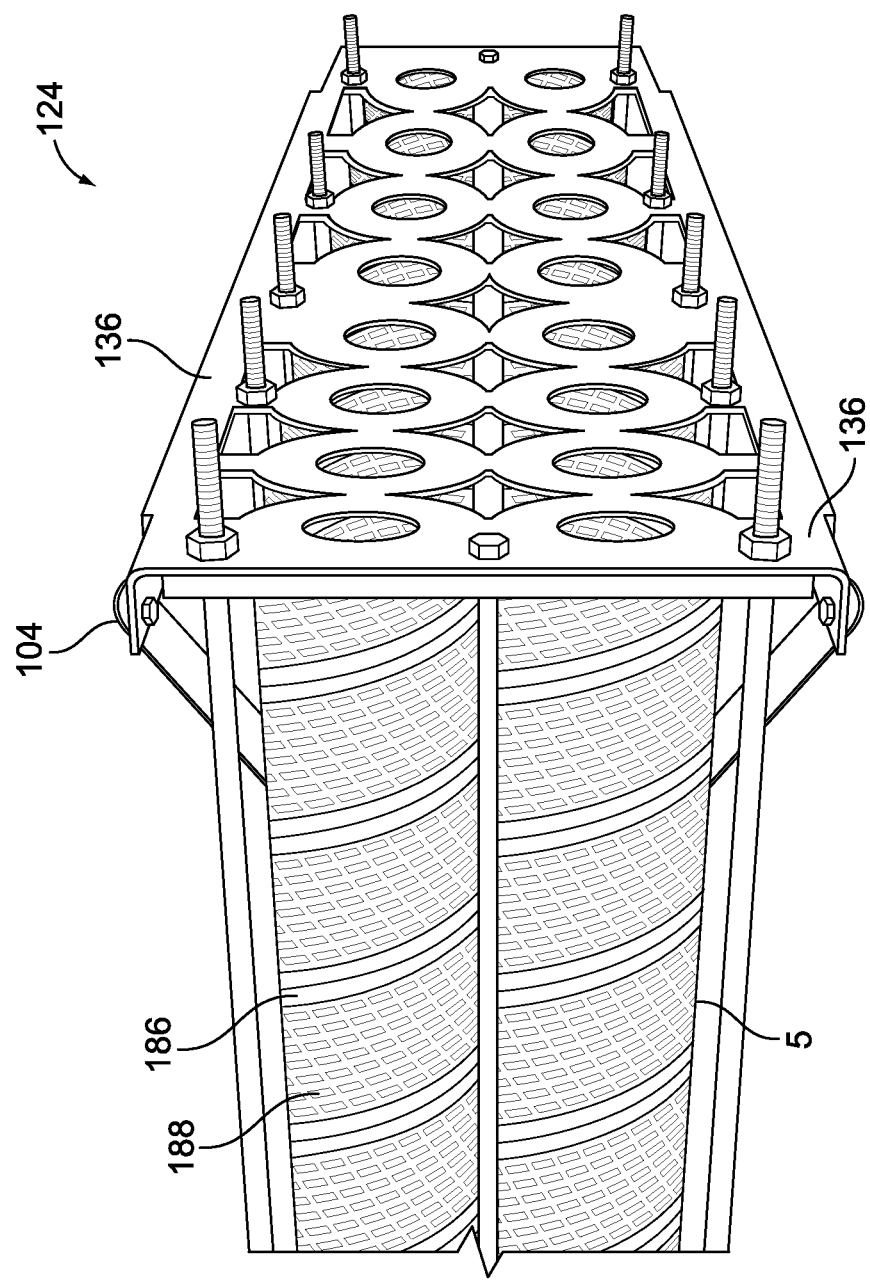
FIG. 18 is a perspective view of the filter grouping of FIG. 16.
Figure 19:
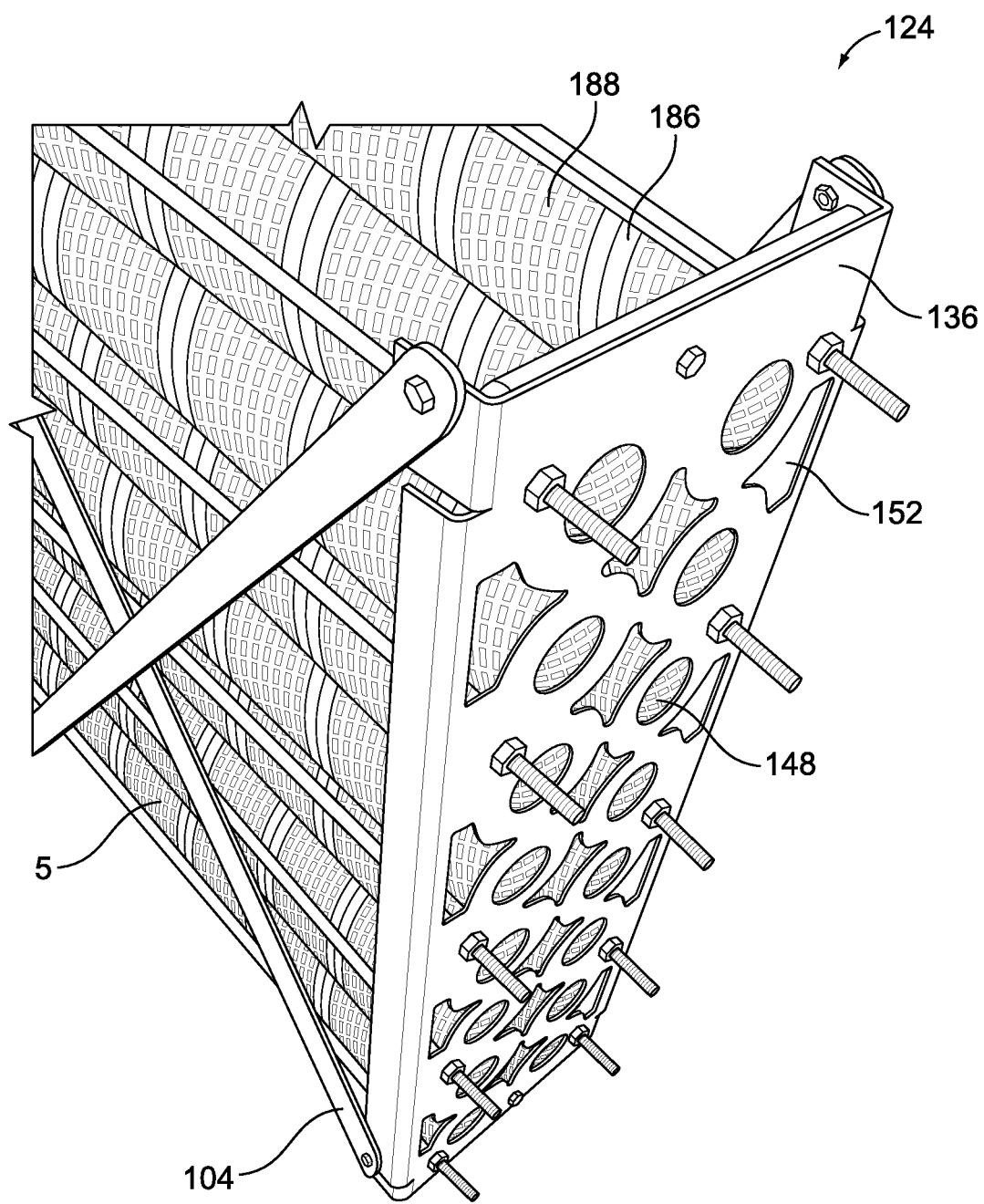
FIG. 19 is a perspective view of the filter grouping of FIG. 16.
Figure 20:
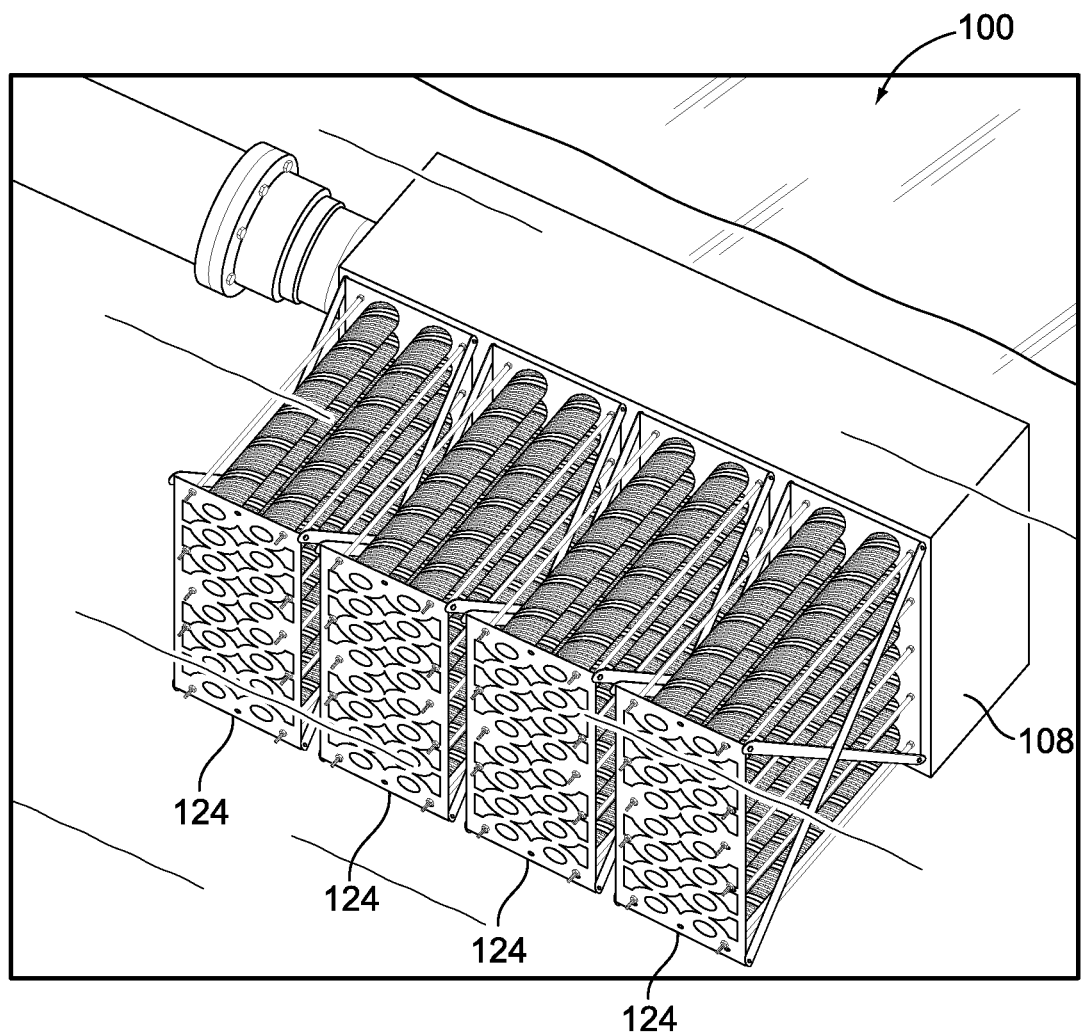
FIG. 20 is a perspective view of the strainer of FIG. 12 in experimental submerged in water test use.
Figure 21:
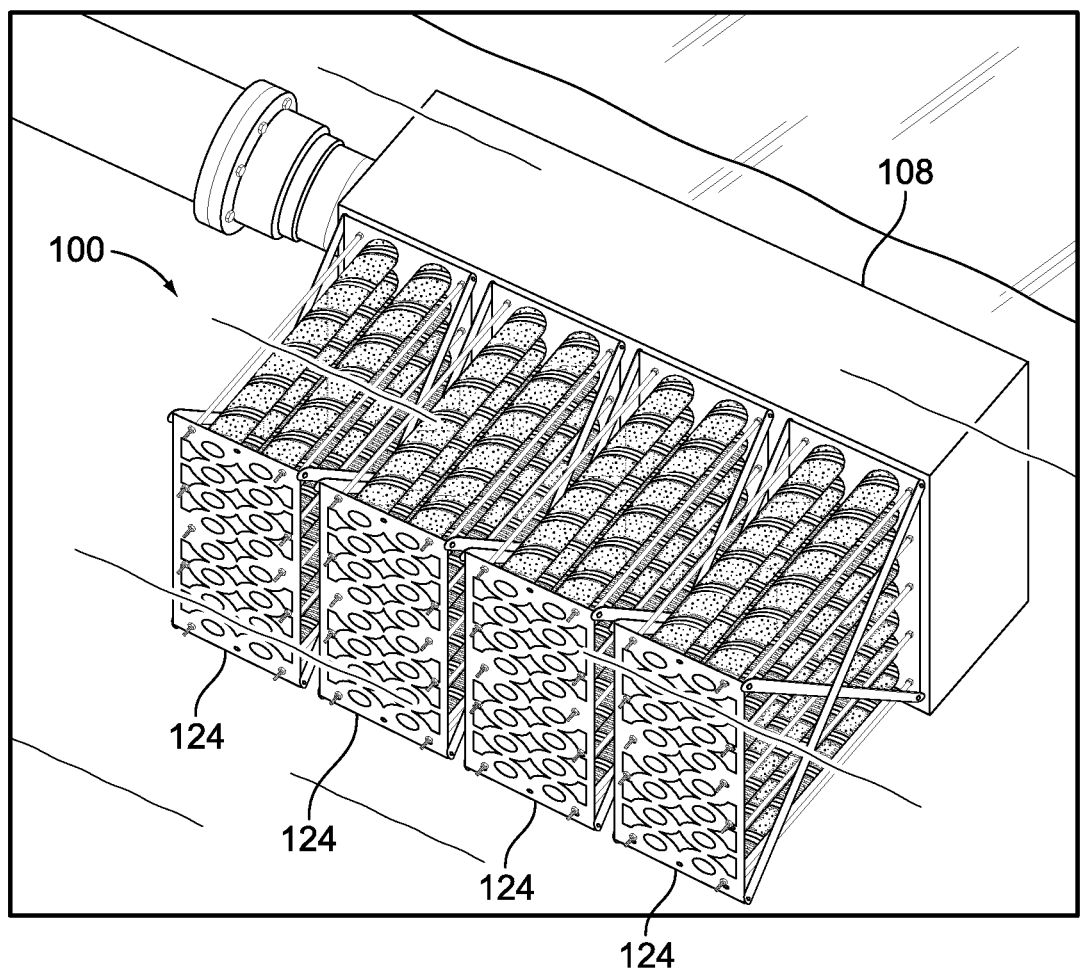
FIG. 21 is a perspective view of the strainer of FIG. 12 in experimental test use as debris begins to build on nested tubes of filter groupings of the strainer.
Figure 22:
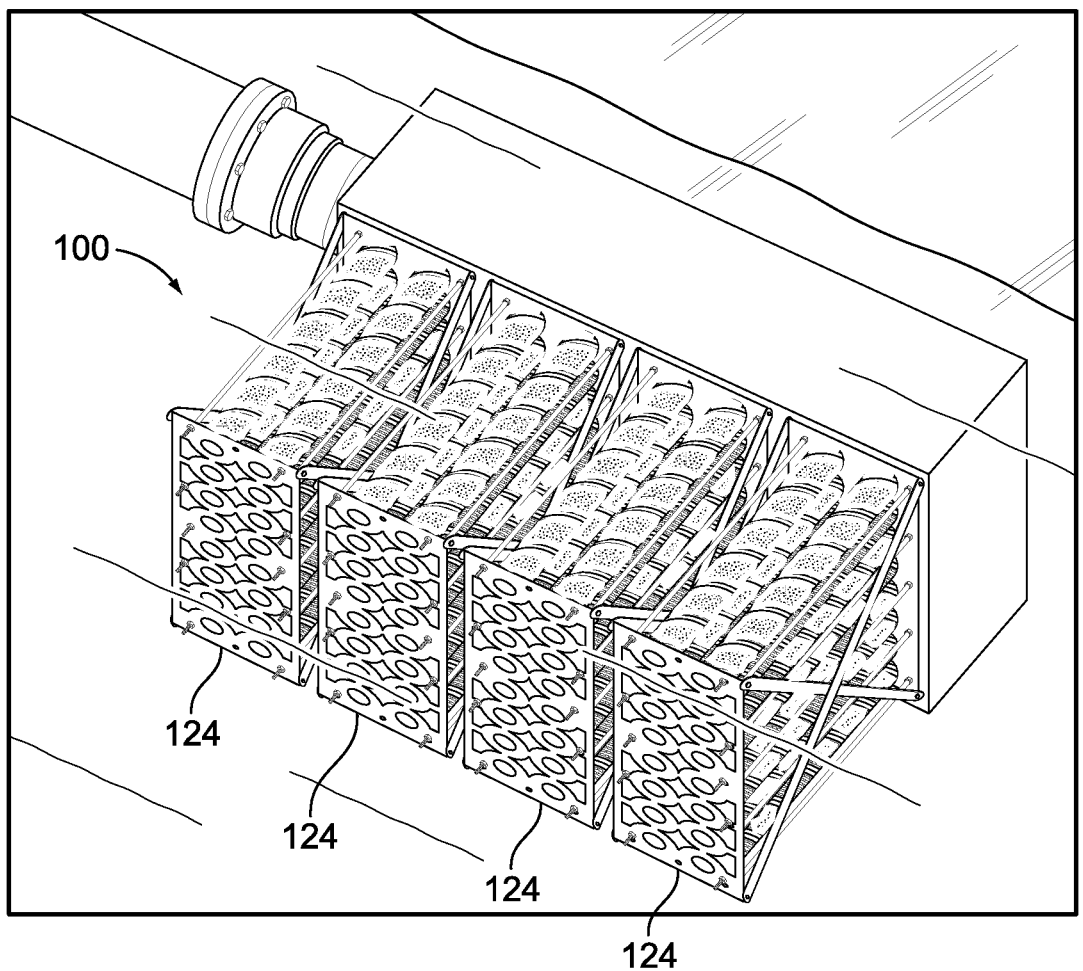
FIG. 22 is a perspective view of the strainer of FIG. 12 in experimental test use as debris continues to build on nested tubes of filter groupings of the strainer.
Figure 23:
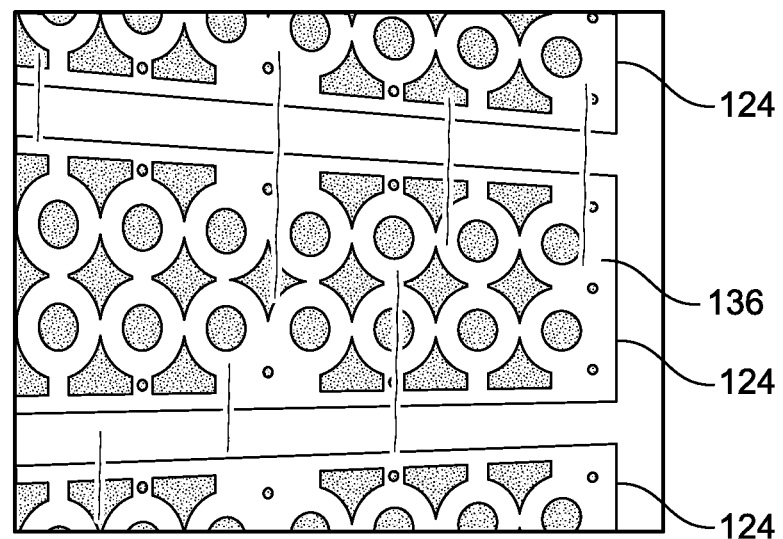
FIG. 23 is a perspective view of the strainer of FIG. 12 in experimental test use, primarily showing a top plate of a grouping and inlets to the nested tubes with debris build up on an inner wall of an inner tube of the nested tubes.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

An embodiment of the present invention will now be described in which, at least:

Reference number 1 is a template plate;
Reference number 2 is a bottom grate;
Reference number 3 is a bottom grate;
Reference number 4 is an aperture in the second bottom grate for receiving a fastener and a centering means;
Reference number 5 is an outer perforated conduit;
Reference number 6 is an inner perforated conduit;
Reference number 7 is a first top grate;
Reference number 8 is a second top grate;
Reference number 9 is a third top grate; and
Reference number 10 is a reinforcement cross member of a frame.

Referring to the figures, a high capacity suction strainer 100 for an emergency core cooling system (ECCS) in a nuclear power plant comprises a frame 104, a flow-through plenum 108, and a filter array 112. In order to increase filter surface area within a given cube volume, filter tubes 5,6 are nested tubes inside the one another with alternating "dirty" water and "clean" water flow paths. The strainer of the present invention may be used with pressurized water reactors, boiling water reactors, or generally any nuclear power plant system comprising an ECCS. The invention also absolutely minimizes (if not entirely eliminates) welding using, instead, mechanical fasteners. Thus, it is very economical to produce and very easy to assemble.

The flow-through plenum 108 is mechanically mounted to the frame and comprises a plurality of inlets 116 located on a template plate 1 and an outlet 120. The plenum 108 is generally an enclosed housing.

The filter array 112 is also mechanically mounted to the frame 104 and comprises a plurality of filter groupings 124, each in fluid communication with an inlet 116 on the plenum 108. The filter groupings 124 are attached to the flow-through plenum 108 by a mechanical fastener.

Each filter grouping 124 comprises a plurality of nested tubes 128. Each nested tube 128 has an inner perforated tube 6 disposed within a corresponding outer perforated tube 5 such that an interstitial space 132 is created between the inner and outer perforated tubes 6,5. The nested tubes 128 are arranged in a plurality of columns and rows and extend outwardly from the plenum 108 such that each nested tube 128 has an outlet forming a fluid communication between each interstitial space 132 and an inlet 116 on the plenum 108.

Each filter grouping 124 also has a flow-through to top plate 136. Each top plate 136 has a plurality of top grates 7,8,9 at a proximal end of the nested tubes 128.

A first top grate 7 has a plurality of first apertures 140 corresponding in size and shape to the outer circumference of each outer perforated tube 5 wherein a proximal end of each outer perforated tube is inserted within and supported by a corresponding first aperture 140. One or more second apertures 144 are located between and about the first apertures 140 to allow a fluid flow therethrough.

A second top grate 8 has a plurality of first apertures 148 aligned with the first apertures 140 in the first top grate 8. Each such aperture 148 has a smaller cross-sectional area than an opening at the proximal end of the outer perforated tube 5 such that the interstitial space 132 between the inner and outer tubes 6,5 is at least substantially sealed against a surface of the second grate 8 and such that a proximal end of each inner perforated tube 6 is inserted within and supported by a corresponding first aperture 148. One or more second apertures 152 are aligned with the second apertures 144 on the first top grate 7 and located between and about the first apertures 148 to allow a fluid flow therethrough.

A third top grate 9 has a plurality of first apertures 156 aligned with the first apertures 148 in the second top grate 8. Each such aperture 156 has a smaller cross-sectional area than an opening at the proximal end of the inner perforated tube 6 such that the proximal end of the inner perforated tube 6 abuts a surface of the third top grate 9 forming the nested tube inlet. One or more second apertures 160 are aligned with the second apertures 152 on the second top grate 8 and located between and about the first apertures 156 to allow a fluid flow therethrough.

The first top grate 7 and the third top grate 9 sandwich the second top grate 8 therebetween. Surfaces of the first top grate 7 and the third top grate 9 engage opposite surfaces of the second top grate 8. The first top grate 7, the second top grate 8, and the third top grate 9 are mechanically attached to the frame 104.

Each filter grouping 124 also has a flow-through bottom plate 164. Each bottom plate 164 has a plurality of bottom grates 2,3 at a distal end of the nested tubes 128. The bottom plates 164 are adapted to act as outlets feeding a filtered fluid to the inlets 116 on the flow-through plenum 108.

A first bottom grate 3 has a plurality of first apertures 168 corresponding in size and shape to the outer circumference of each outer perforated tube 5 wherein a distal end of each outer perforated tube 5 is inserted within and supported by a corresponding first aperture 168.

A second bottom grate 2 has a plurality of first apertures 172. Each such aperture 172 is aligned with a corresponding interstitial space 132 between an inner perforated tube 6 and an outer perforated tube 5. The second bottom grate 2 also has a plurality of second apertures 176. Each second aperture 176 is aligned with an opening at a distal end of a corresponding inner perforated tube 6, which forms the nested tube 128 outlet aligned with an inlet on the plenum 108. A central webbing 180 about each second aperture 176 substantially seals the opening at the distal end of the corresponding inner perforated tube 6. A mechanical fastener 180 passes through each second aperture 176 and engages the distal end of the corresponding inner perforated tube 6 to maintain the corresponding inner perforated tube 6 in a desired position in the nested tube 124. Typically, a washer or other substantially donut-shaped member is attached to the mechanical fastener and is located within the inner perforated tube 6 to center the inner perforated tube 6.

The first bottom grate 3 and a surface of the plenum 108 sandwich the second bottom grate 2 therebetween such that surfaces of the first bottom grate 3 and the plenum 108 engage opposite surfaces of the second bottom grate 2. The first bottom grate 3 and the second bottom grate 2 are mechanically attached to the frame 104.

Accordingly, the interstitial spaces 132 between the inner perforated tubes 6 and the outer perforated tubes 5 are adapted to receive a filtered fluid flow as a contaminated fluid passes from outer surfaces to inner surfaces of the outer perforated tubes 5 and from inner surfaces to outer surfaces of the inner perforated tubes 6.

Each top plate 136 is mechanically joined to a corresponding bottom plate 164 by a tie rod. Each top plate 136 is separated from the corresponding bottom plate 164 by the plurality of nested tubes 124. Each top plate 136 is further mechanically joined to a corresponding bottom plate 164 by a pair of cross members 10, which are joined to the top plate 136 by a mechanical fastener and to the corresponding bottom plate 164 at an opposing end by a mechanical fastener.

The template plate 1 forms the plurality of inlets on the plenum 108. Accordingly, the template plate 1 has a plurality of openings. Each opening is aligned with a filter grouping to provide the inlets to the plenum. The template plate is mechanically attached to the plenum 108, to each of the groupings 124 and the frame 104.

Figure 24:
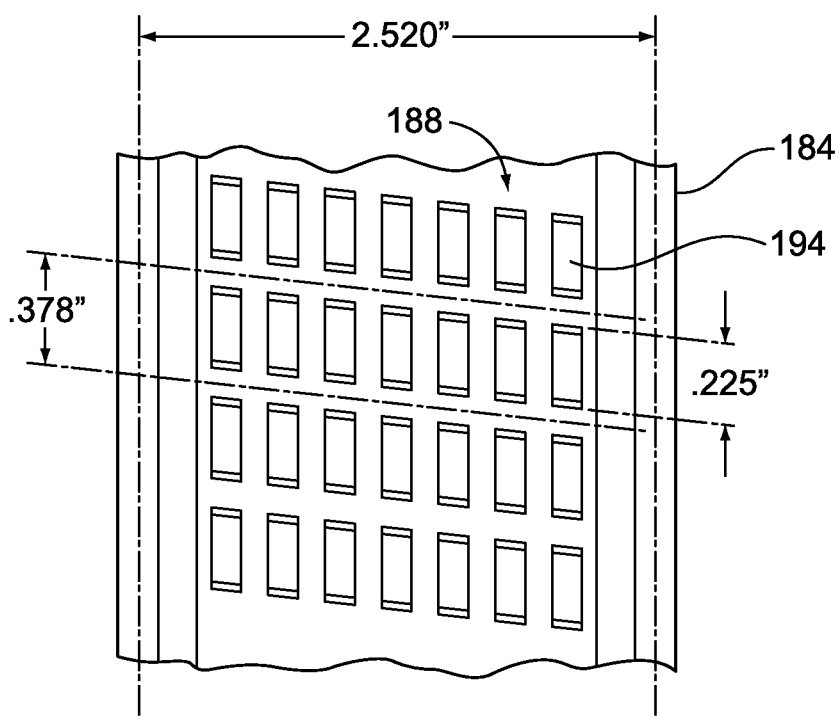
FIG. 24 is a partial plan view of a perforated sheet used to form a tube used in the present invention.
Figure 25:
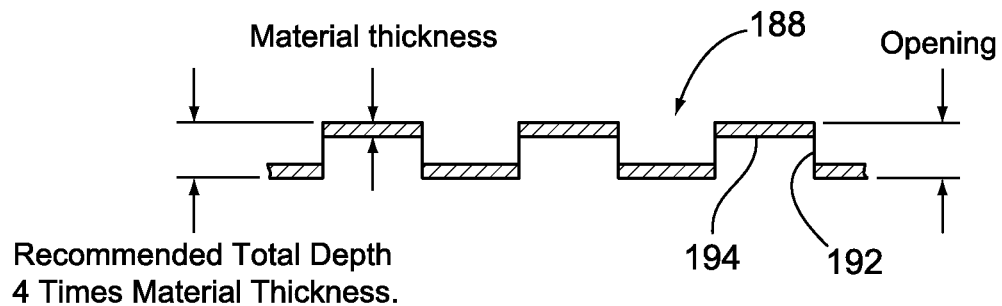
FIG. 25 is a partial cross-sectional view of the sheet of FIG. 24.
Figure 26:
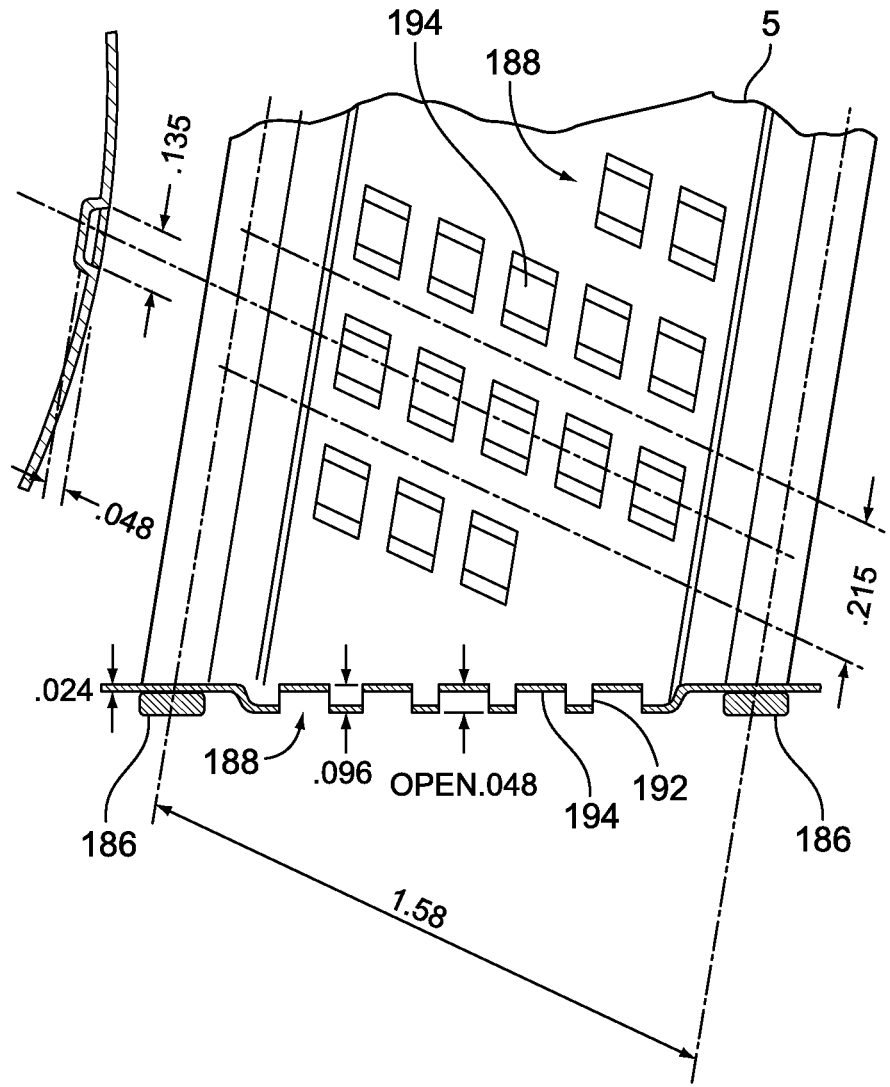
FIG. 26 is a partial cross-sectional view of a tube formed from a perforated sheet as used in the present invention

As illustrated in FIGS. 24-26, the tubes are generally produced from a stainless steel 184 strip that is rolled, perforated, and cut in a continuous process. Opposing edges of the perforated strip are brought into engagement and joined by a mechanical seam 186. The opposing edges are brought together by twisting or rotating a terminal end of the strip such that the strip forms a tube having a helical seam, one edge receiving a portion of the opposing edge into a receiver to form the mechanical seam.

The perforations 188 are formed in a fluted fashion. Longitudinal recesses are formed on a surface of the metal sheet 184 forming slotted opposing parallel openings 192 separated by a segment 194 of the metal sheet 184. It should be understood that the segment 194 is recessed relative to an outer surface of the tubes 5,6. When viewed from an inner surface of the tubes 5,6, the segments 194 will appear as protrusions or extensions. This will be explained in more detail below. The structure of the tubes with mechanical seam lends itself to repetition and changes in length and the tube diameter as will be understood from the description below taken in combination with structure so far explained.

Again, a tube is formed by twisting the sheet 184 to form a helical orientation and draw the opposing edges together. The opposing edges have complimentary mechanically formed seaming members which are interlocked to form the mechanical seam 186. The resulting mechanical seam 186 forms a helical structure winding about a length of the tubes. Among other things, the mechanical seam 186 eliminates the need for welding of the tube in order for it to achieve structural integrity, which is an improvement over prior designs.

As can be seen on, for example, FIGS. 13-18, the openings 192 create a double helix pattern in the finished nested tubes. A first helix pattern of the openings is parallel to the seam 186. A second helix pattern of the openings 192 extends generally transverse to the seam 186 in an opposite direction. In one embodiment, the first helix pattern is a right-handed helix, and the second helix pattern is a left-handed helix. It should be understood that the patterns 300,302 can be reversed without departing from the spirit of the invention.

A pitch of the first helix pattern is generally substantially less than a pitch of the second helix pattern. In one embodiment, the pitch of the second helix pattern is 6 times greater than the pitch of the first helix pattern. In another embodiment, the pitch of the second helix pattern is 7 times greater than the pitch of the first helix pattern. In one preferred embodiment, the outer tube 5 of the nested tubes has a second helix pattern having a pitch 6 times greater than a pitch of the first helix pattern, and an inner tube 6 of the nested tubes has a second helix pattern having a pitch 7 times greater than a pitch of the first helix pattern. The ratio of the respective pitches of the second helix pattern and the first helix pattern may be greater than 3, between about 3 to about 10, between about 4 to about 8, between about 6 to about 8, or any range or combination of ranges therein.

An improvement over the prior art nested tubes is believed to be the flow angle of the fluid entering the tubes 5,6. In a prior art configuration shown in FIGS. 27-29, tubes 200 are formed from a metal sheet having opposing edge portions welded to form a longitudinal welded seam 204 which forms a tube. The metal sheet is stamped or pierced with round apertures 208 to form a perforated tube 200. A fluid flow entry angle 210 is typically about 90 degrees in this configuration, as shown in FIG. 29. It is believed that an undesired turbulent flow is established at knife edges of each aperture.

Figure 30:
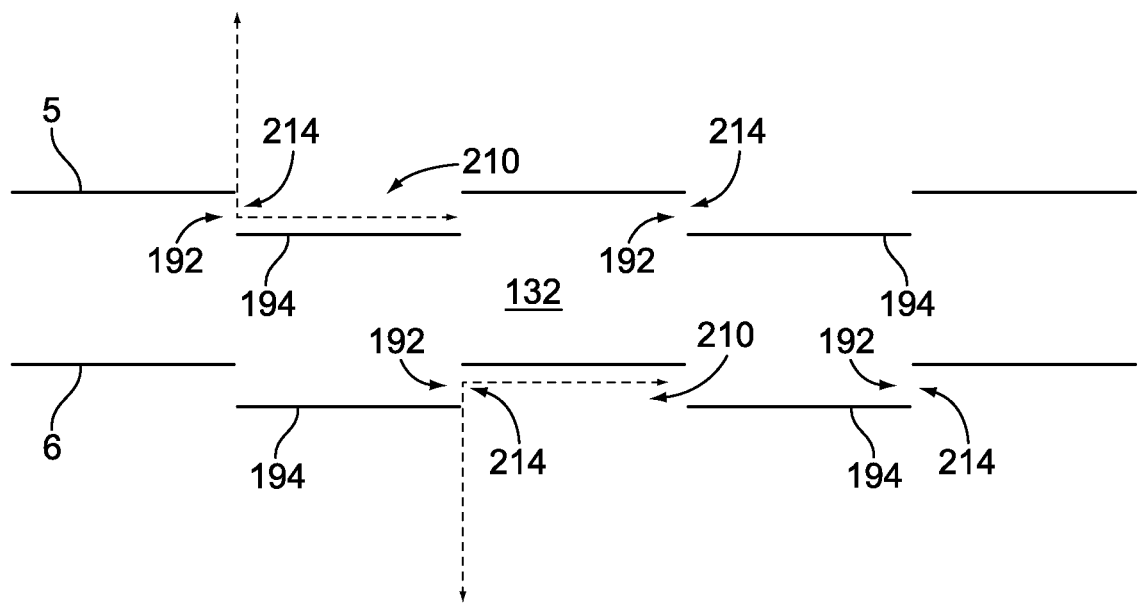
FIG. 30 is schematic of a nested tube arrangement of the present invention showing a flow angle entering an interstitial area.

As illustrated in FIG. 30, a fluid flow 214 enters the interstitial area 132 of the nested tubes at an angle less than 90 degrees, rather than a 90 degree angle as experienced in the prior art tubes. This results in a reduction or elimination of turbulent flow at the knife edge of the openings.

As shown in FIG. 30, fluid flow 214 enters the interstitial area 132 through the outer tube 5 via negative, depressed, or recessed portions 194 from an outer space surrounding the tube 5 to the interstitial area 132 within an interior space of the tube 5. Because the openings 192 are slotted, angled greater than 0 degrees relative to the recessed portions 194, generally perpendicular to an outer cylindrical surface of the tube 5, insulation fibers, which can be long and thin in structure, are less likely to enter the interstitial area 132 and/or clog or otherwise obstruct flow at the openings 192 than if the openings were stamped apertures parallel to the cylindrical outer surface of the tube as is prevalent in the prior art. Thus, the slotted openings 192 may have an entrance to the interstitial area 132 which is radially outwardly of the recessed portion 194 and radially inwardly of a radially outermost surface of the tube 5 as shown on FIG. 30.

As also shown in FIG. 30, fluid flow 214 enters the interstitial area 132 through the inner tube 6 via positive, extended, or protruding segments 194 from an interior space of the inner tube 6 to the interstitial area 132. Similar to the openings 194 on the outer tube 5, the openings 192 on the inner tube 6 are slotted, angled greater than 0 degrees relative to the segments 194 between the slots, generally perpendicular to an inner cylindrical surface of the tube 6. Thus, the slotted openings 192 may have an entrance to the interstitial area 132 which is radially outwardly of the segment 194 and which extends radially inwardly from a cylindrical surface of the tube 6 into the interior space of the tube 6 as shown on FIG. 30.

Figure 31:
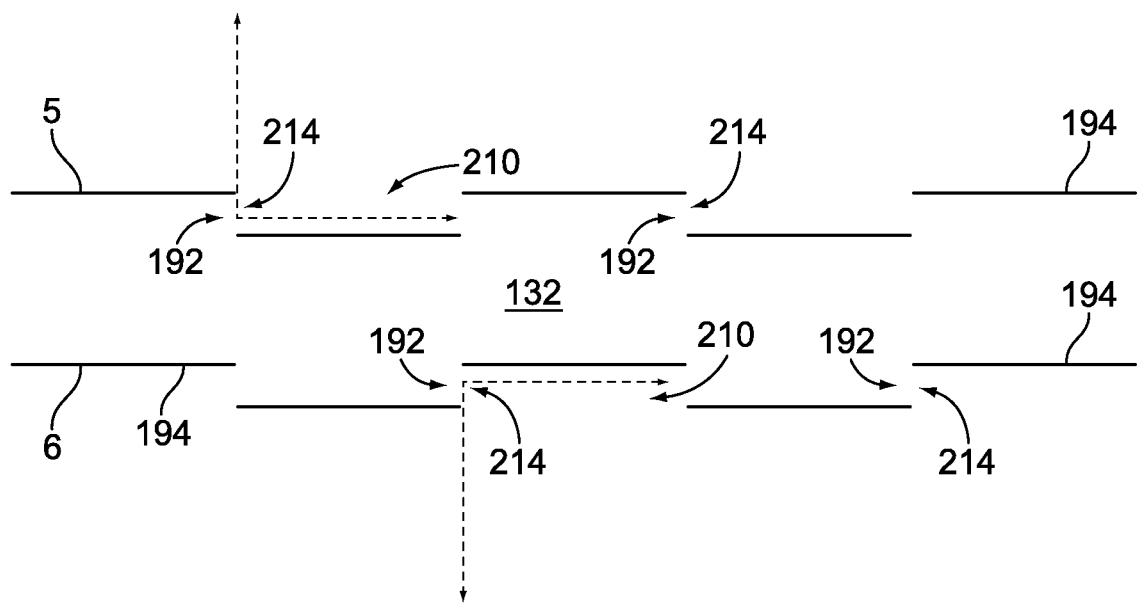
FIG. 31 is schematic of an alternative nested tube arrangement of the present invention showing a flow angle entering an interstitial area.

The orientations of the openings 192 described above on the tubes 5,6 may be reversed. Here, the outer tube 5 has slotted openings extending radially outwardly from the cylindrical surface of the tube 5 and the segments 194 are protruding radially outwardly on the cylindrical surface. The inner tube 6 has slotted openings extending radially outwardly characterized by segments 194 also protruding radially outwardly from the cylindrical surface. See FIG. 31.

Figure 32:
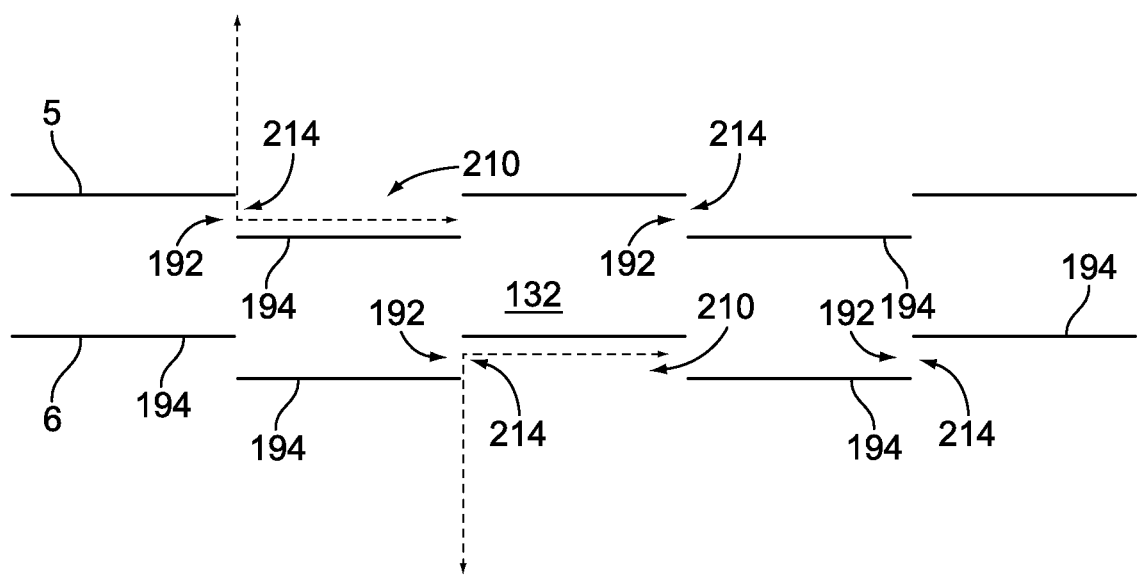
FIG. 32 is schematic of an alternative nested tube arrangement of the present invention showing a flow angle entering an interstitial area.

Alternatively, the orientations can be mixed such that one tube has radially outwardly projecting segments 194, and the other tube has radially inwardly projecting segments 194. See FIG. 32.

Alternatively still, the orientations of the projecting segments 194 can be mixed on each tube 5,6. In this embodiment, a single tube can exhibit both radially inwardly and outwardly projecting segments 194.

The nested tubes 5,6 with radially extending slotted openings provide at least the following improvements over prior designs. By-pass is reduced. By-pass is amount of material that passes through the nested tube medium and beyond the suction strainer, i.e. not filtered. Additionally, head loss is reduced. Head loss, in this case, is a pressure drop across the filter medium.

Figure 28:
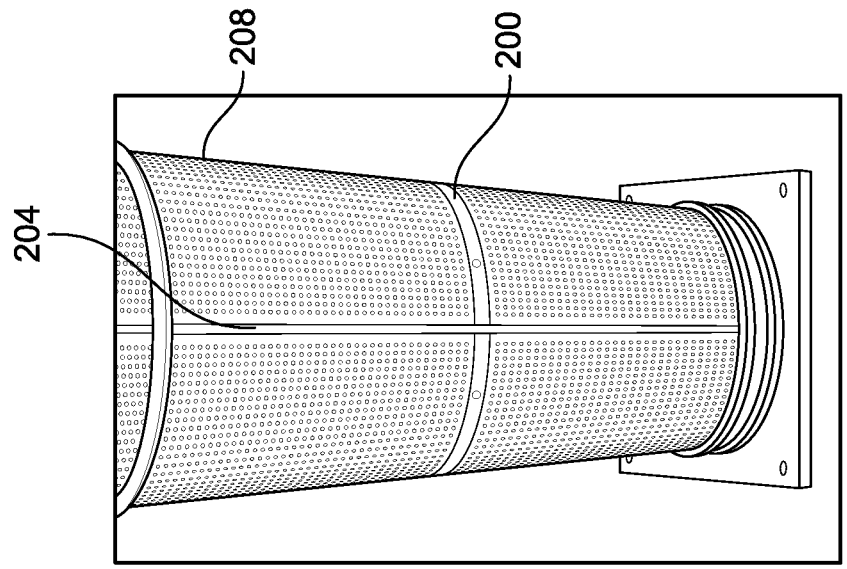
FIG. 28 is a perspective view of a prior art tube used in a prior art strainer.
Figure 27:
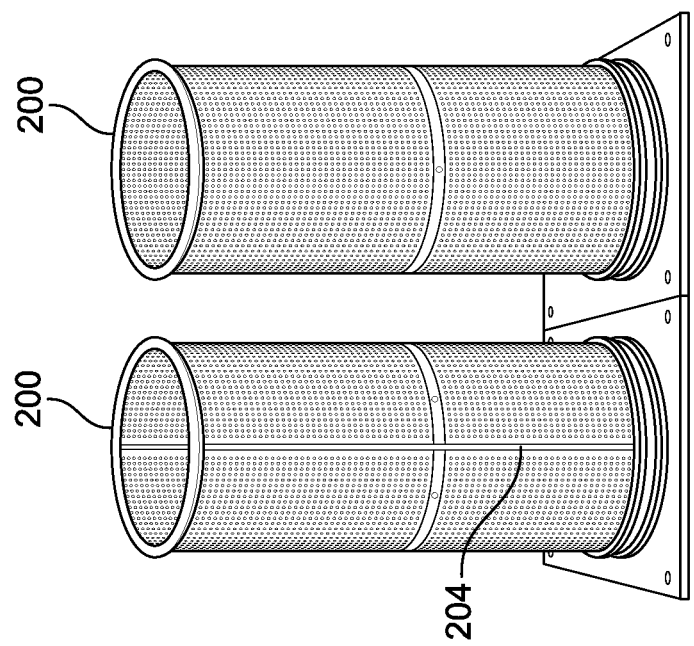
FIG. 27 is a perspective view of a prior art tube used in a prior art strainer.
Figure 29:
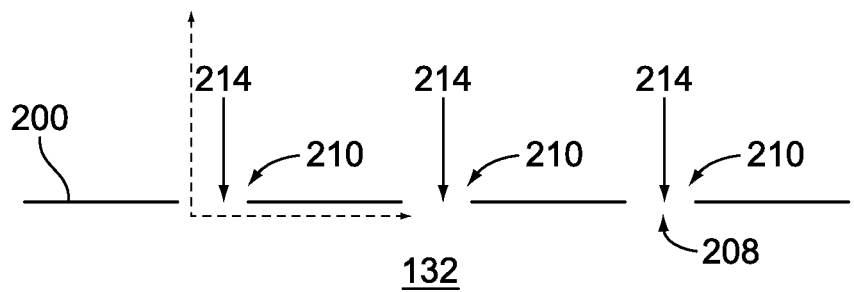
FIG. 29 is a schematic of a prior art tube showing a flow angle entering an interstitial area.
Figure 34:
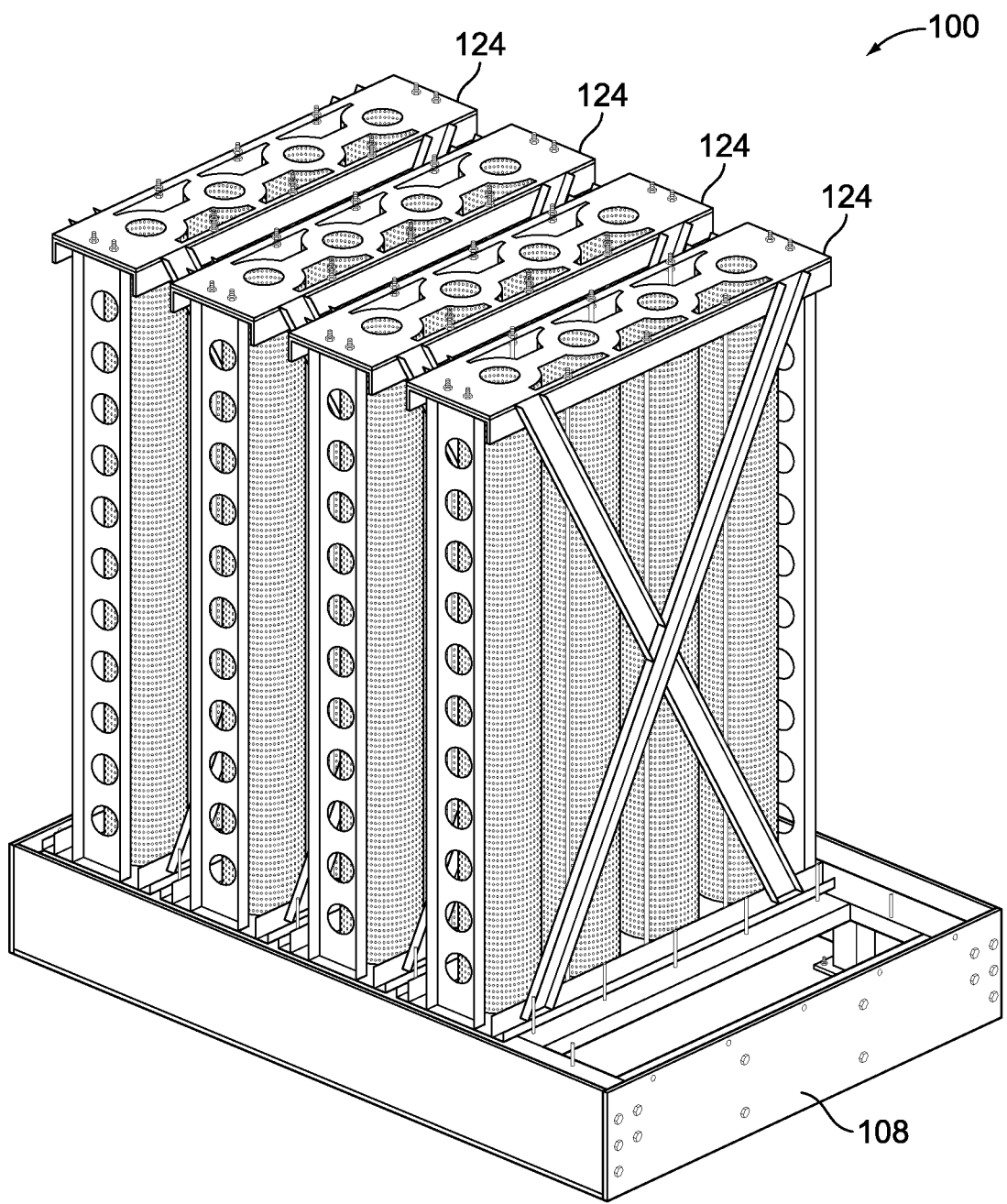
FIG. 34 is an alternative embodiment of the suction strainer of the present invention, featuring nested tubes having a prior art aperture arrangement.

In another embodiment illustrated in FIG. 34, the high capacity suction strainer 100 according to the present invention is outfitted with nested tubes 5,6 as in the previous example with the exception that the nested tubes 5,6 have conventional perforations similar to the prior art tubes 200 illustrated in FIGS. 27-29.

Figure 33:
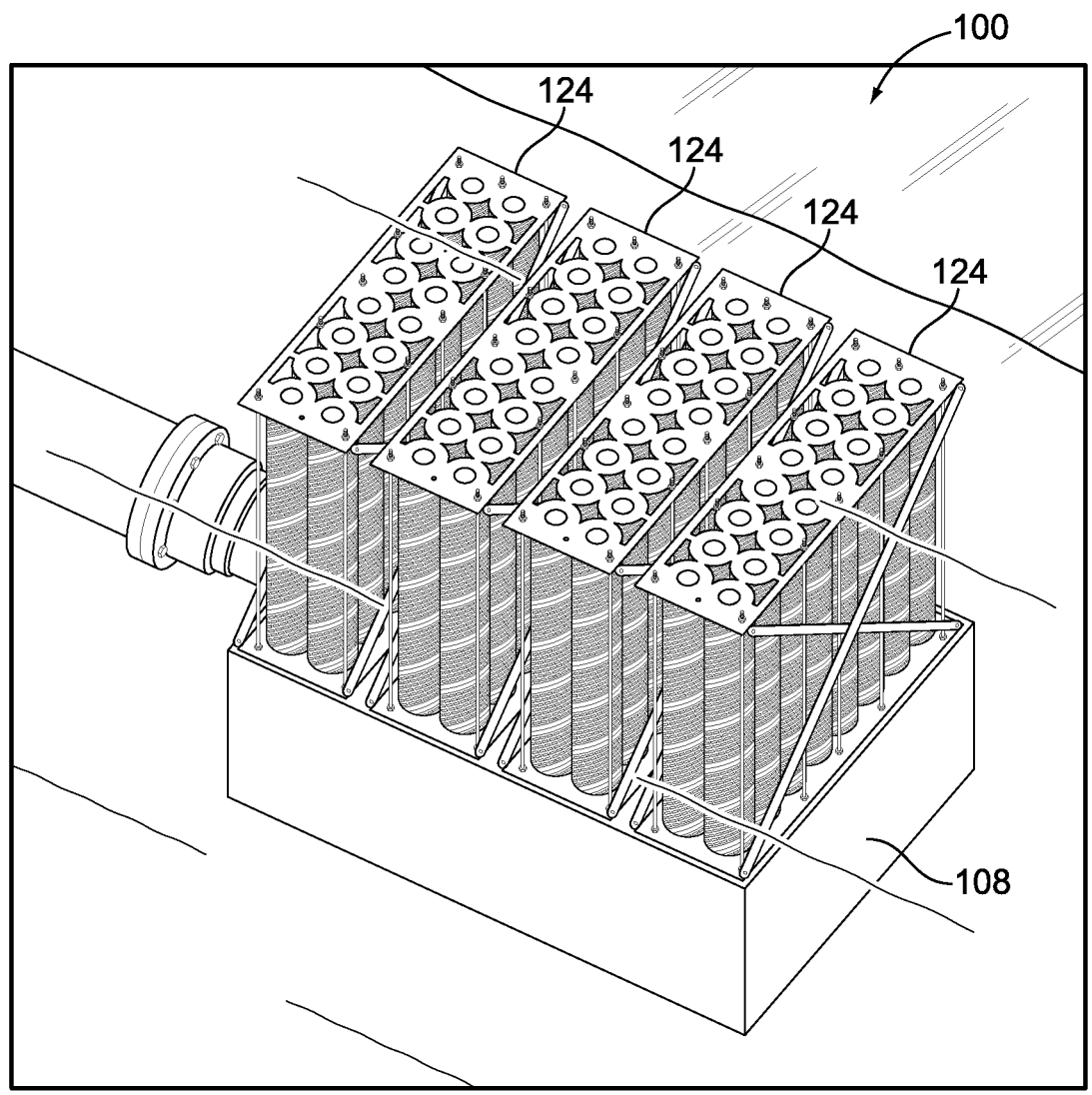
FIG. 33 is a perspective view of the strainer of FIG. 12 in experimental submerged in water test use and oriented such that the nested tube arrangement is vertical relative to an upper surface of the water in the experimental containment structure.
Figure 35:
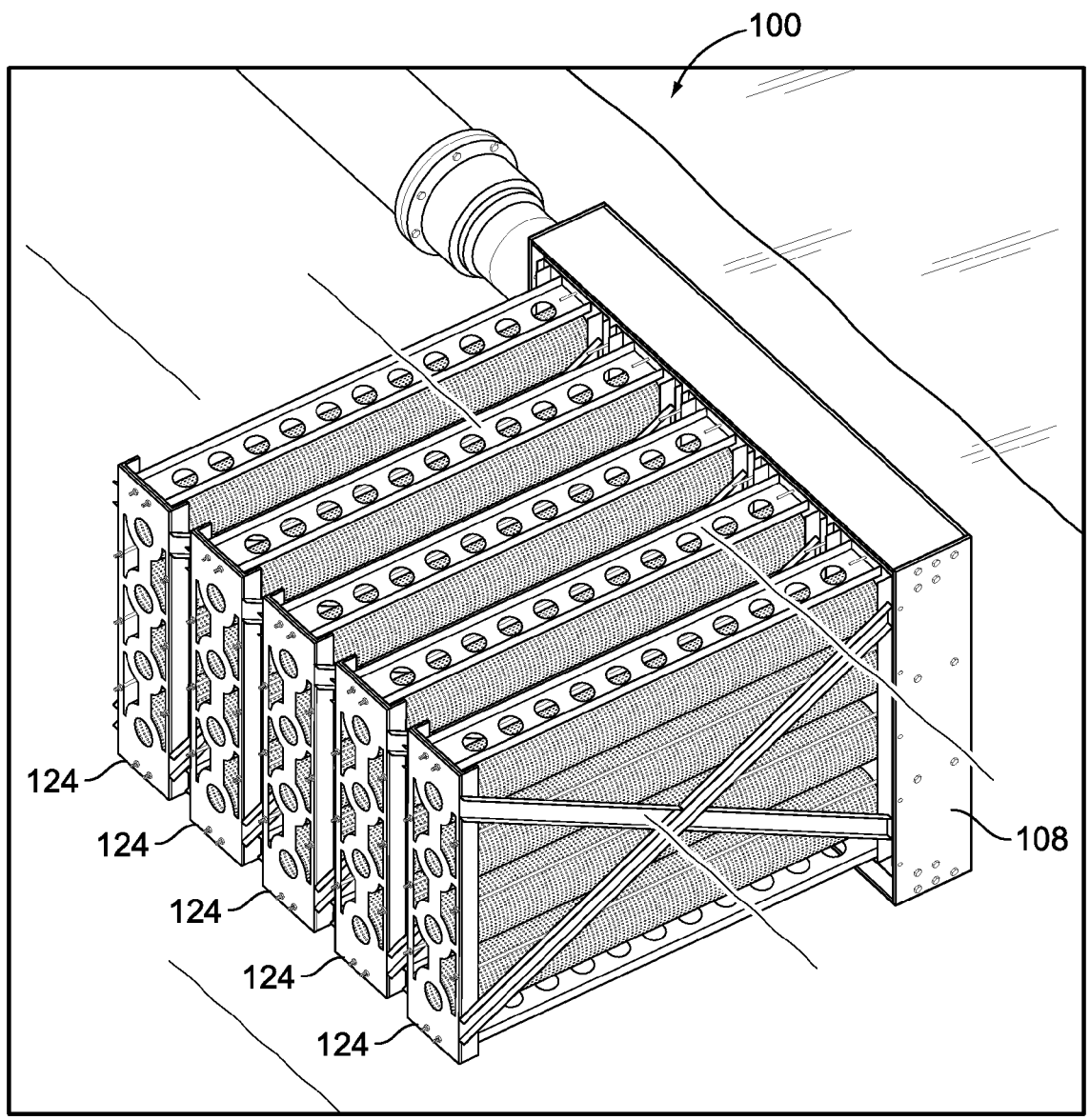
FIG. 35 is a perspective view of the strainer of FIG. 34 in experimental submerged in water test use and oriented such that the nested tube arrangement is substantially vertical relative to an upper surface of the water in the experimental containment structure.
Figure 36:
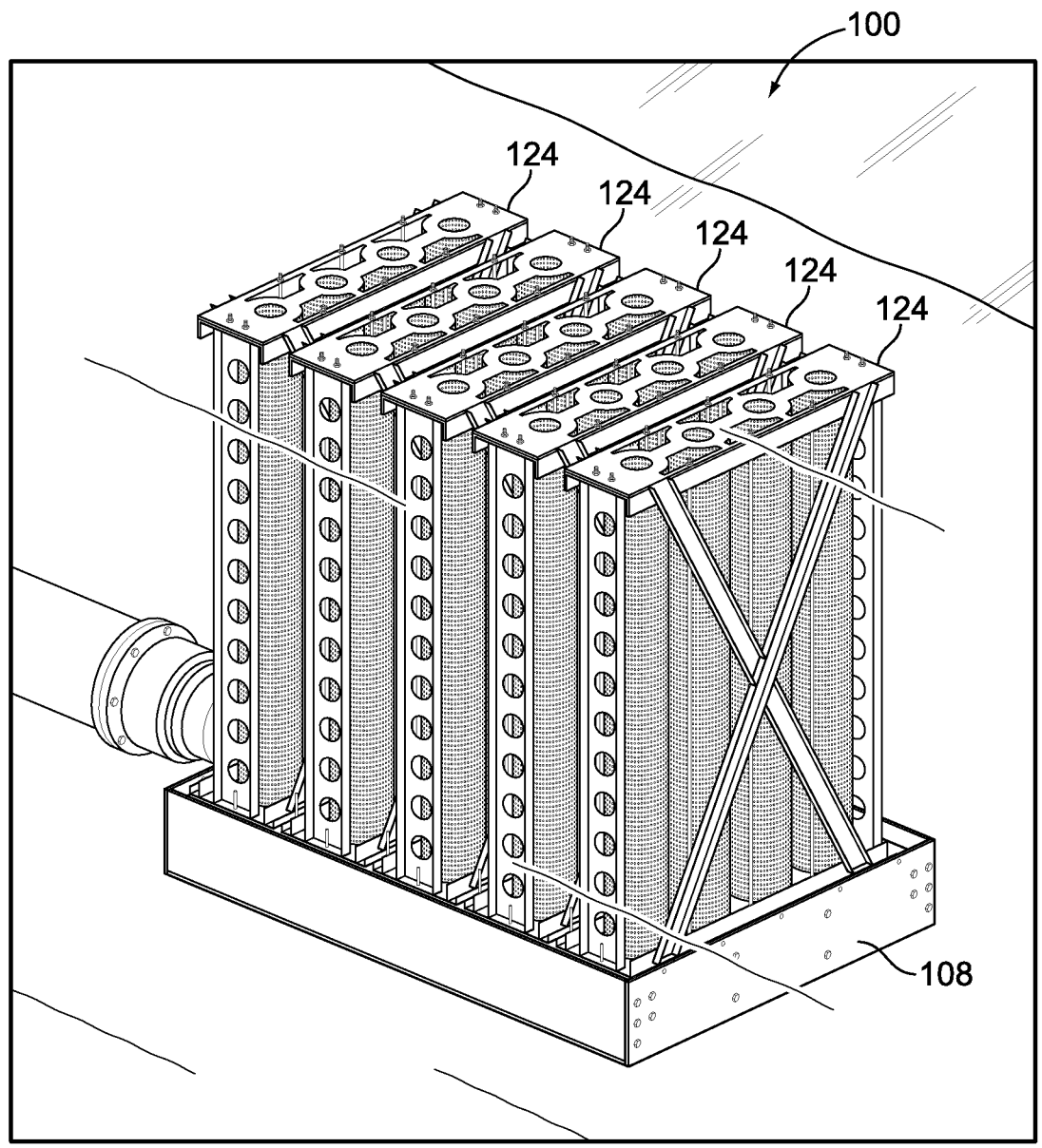
FIG. 36 is a perspective view of the strainer of FIG. 34 in experimental submerged in water test use and oriented such that the nested tube arrangement is substantially parallel relative to an upper surface of the water in the experimental containment structure.

It should be understood that the nested tubes 5,6 may be oriented substantially horizontally to horizontally relative to an upper surface of the fluid within a containment area as illustrated in FIGS. 20-23 and 36 or substantially vertically to vertically as illustrated in FIGS. 33 and 35. Alternatively, the nested tubes 5,6 may be oriented at any angle or angles therebetween, specifically angles between 0 degrees and 90 degrees relative to the upper surface of the fluid in the containment area. When the nested tubes 5,6 are oriented 0 degrees relative to the upper surface of the fluid in the containment area, the tubes are substantially parallel to the upper surface of the fluid, i.e. substantially horizontally oriented. When the nested tubes 5,6 are oriented 90 degrees relative to the upper surface of the fluid in the containment area, the tubes are substantially perpendicular to the upper surface of the fluid, i.e. substantially vertically oriented.

Factors that influence the orientation of the nested tubes 5,6 may be required strength of the assembly and/or the available space within the containment area for accommodating the suction strainer 100.

Figure 37:
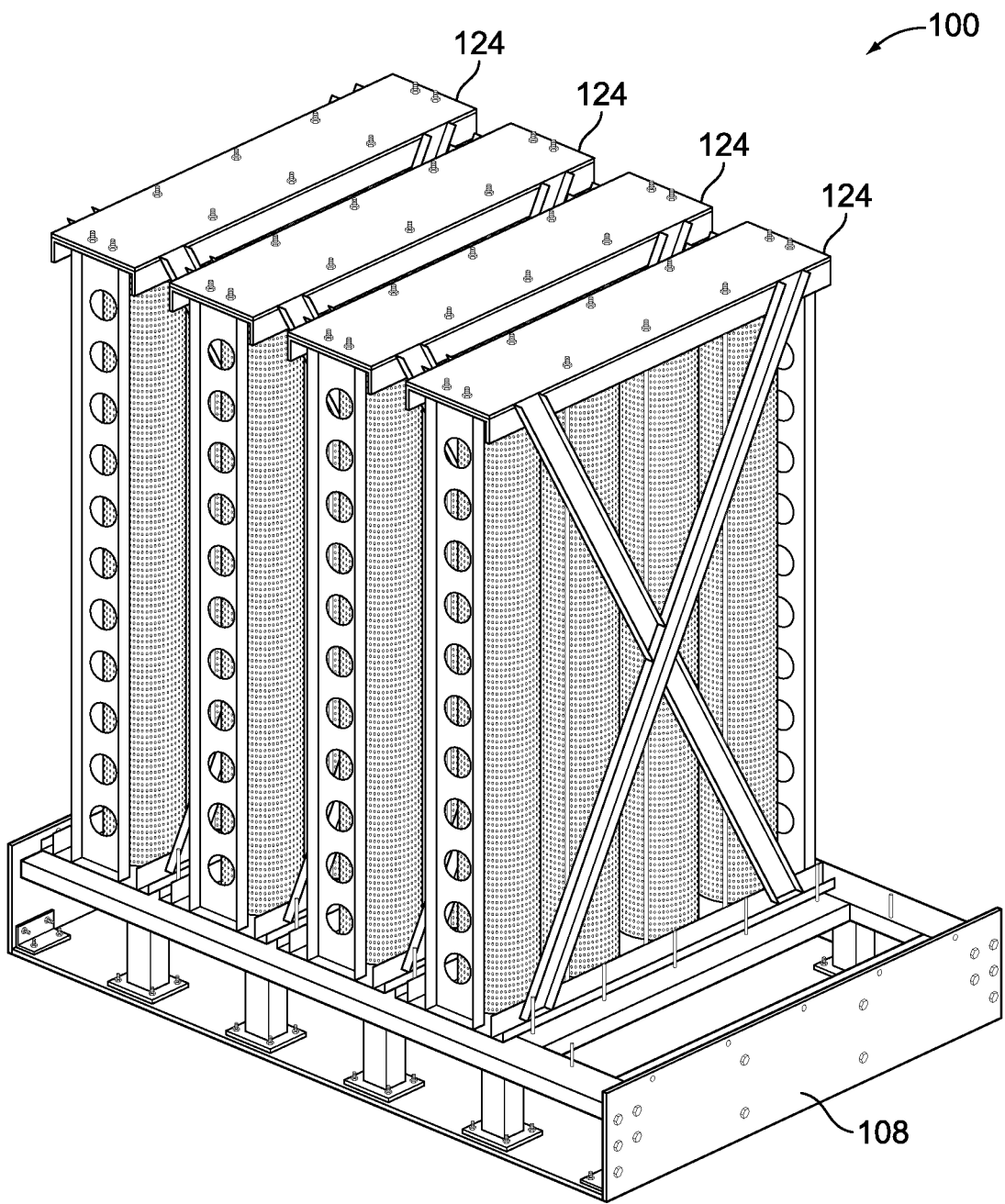
FIG. 37 is a perspective of a suction strainer according to the present invention without nested tubes.

The suction strainers described herein may also be outfitted with single tubes rather than nested tubes. See FIG. 37.

The terms "first," "second," "upper," "lower," "top," "bottom," etc., when used, are for illustrative purposes relative to other elements only and are not intended to limit the embodiments in any way. The term "plurality" as used herein is intended to indicate any number greater than one, either disjunctively or conjunctively as necessary, up to an infinite number. The terms "joined," "attached," and/or "connected" as used herein are intended to put or bring two elements together so as to form a unit, and any number of elements, devices, fasteners, etc. may be provided between the joined or connected elements unless otherwise specified by the use of the term "directly" and/or supported by the drawings. The pitch of a helix is the width of one complete helix turn, measured parallel to the axis of the helix. If the movement away from the observer is clockwise, then the helix is right-handed. Most hardware screw threads (a screw thread, often shortened to thread, is a helical structure used to convert between rotational and linear movement and force) are right-handed helices. If the movement is in the anti-clockwise direction, then a left-handed helix is being observed. The term "substantially" as used to modify the angle of the nested tubes encompasses ±10 degrees.

While the specific embodiments have been illustrated and described, numerous modifications come to mind without significantly departing from the spirit of the invention, and the scope of protection is only limited by the scope of the accompanying Claims.

What is claimed is:

1. A high capacity suction strainer for an emergency core cooling system in a nuclear power plant comprising:
   a frame;
   a flow-through plenum mechanically mounted to the frame and comprising a plurality of inlets and an outlet; and
   a filter array also mechanically mounted to the frame and comprising a plurality of filter groupings, each in fluid communication with a corresponding inlet on the plenum, each filter grouping comprising:
      a plurality of nested tubes, each comprising an inner perforated tube disposed within a corresponding outer perforated tube such that an interstitial space is created between the inner and outer perforated tubes;
      a flow-through top plate comprising a plurality of top grates located at a proximal end of the nested tubes; and
      a flow-through bottom plate wherein each top plate is mechanically joined to a corresponding bottom plate by a tie rod and each top plate is separated from the corresponding bottom plate by the plurality of nested tubes;
   wherein the plurality of top grates comprises:
      a first top grate comprising a plurality of first apertures corresponding in size and shape to the outer circumference of each outer perforated tube wherein a proximal end of each outer perforated tube is inserted within and supported by a corresponding first aperture and a plurality of second apertures located between and about the first apertures to allow a fluid flow therethrough; and
      a second top grate comprising a plurality of first apertures aligned with the first apertures in the first top grate, each having a smaller cross-sectional area than an opening at the proximal end of the outer perforated tube such that the interstitial space between the inner and outer tubes is at least substantially sealed against a surface of the second grate and such that a proximal end of each inner perforated tube is inserted within and supported by a corresponding first aperture, and a plurality of second apertures aligned with the second apertures on the first top grate and located between and about the first apertures to allow a fluid flow therethrough; and
   wherein each top plate is mechanically joined to a corresponding bottom plate by a tie rod and each top plate is separated from the corresponding bottom plate by the plurality of nested tubes.

2. The high capacity suction strainer of claim 1 wherein the nested tubes are arranged in a plurality of columns and rows and extend outwardly from the plenum such that each nested tube has a nested tube outlet forming a fluid communication between each interstitial space and an inlet on the plenum.

3. The high capacity suction strainer of claim 2 wherein the plurality of top grates comprises:
   a third top grate comprising a plurality of first apertures aligned with the first apertures in the second top grate, each having a smaller cross-sectional area than an opening at the proximal end of the inner perforated tube such that the proximal end of the inner perforated tube abuts a surface of the third top grate forming the nested tube inlet, and a plurality of second apertures aligned with the second apertures on the second top grate and located between and about the first apertures to allow a fluid flow therethrough.

4. The high capacity suction strainer of claim 3 wherein the plurality of bottom grates comprises:
   a first bottom grate comprising a plurality of first apertures corresponding in size and shape to the outer circumference of each outer perforated tube wherein a distal end of each outer perforated tube is inserted within and supported by a corresponding first aperture.

5. The high capacity suction strainer of claim 4 wherein the plurality of bottom grates comprises:
   a second bottom grate comprising a plurality of first apertures, each aligned with a corresponding interstitial space between an inner perforated tube and an outer perforated tube, a plurality of second apertures, each aligned with an opening at a distal end of a corresponding inner perforated tube forming the nested tube outlet aligned with an inlet on the plenum, a central webbing about each second aperture substantially sealing the opening at the distal end of the corresponding inner perforated tube, and a plurality of mechanical fasteners, each fastener passing through a corresponding second aperture and engaging the distal end of the corresponding inner perforated tube to maintain the corresponding inner perforated tube in a desired position in the nested tube.

6. The high capacity suction strainer of claim 5 wherein the first top grate and the third top grate sandwich the second top grate therebetween such that surfaces of the first top grate and the third top grate engage opposite surfaces of the second top grate.

7. The high capacity suction strainer of claim 6 wherein the first top grate, the second top grate, and the third top grate are mechanically attached to the frame.

8. The high capacity suction strainer of claim 7 wherein the first bottom grate and a surface of the plenum sandwich the second bottom grate therebetween such that surfaces of the first bottom grate and the plenum engage opposite surfaces of the second bottom grate.

9. The high capacity suction strainer of claim 8 wherein the first bottom grate and the second bottom grate are mechanically attached to the frame.

10. The high capacity suction strainer of claim 9 wherein each top plate is mechanically joined to a corresponding bottom plate by a pair of cross members joined to the top plate by a mechanical fastener and to the corresponding bottom plate at an opposing end by a mechanical fastener.

11. The high capacity suction strainer of claim 10 wherein each filter grouping is attached to the flow-through plenum by a mechanical fastener.

12. The high capacity suction strainer of claim 5 wherein the interstitial spaces between the inner perforated tubes and the outer perforated tubes are adapted to receive a filtered fluid flow as a contaminated fluid passes from outer surfaces to inner surfaces of the outer perforated tubes and from inner surfaces to outer surfaces of the inner perforated tubes.

13. The high capacity suction strainer of claim 12 wherein the bottom plates are adapted to act as outlets feeding a filtered fluid to the inlets on the flow-through plenum.

14. The high capacity suction strainer of claim 1 wherein the nested tubes are oriented between 0 degrees and 90 degrees relative to an upper surface of a fluid in a containment area.

15. The high capacity suction strainer of claim 1 wherein the nested tubes are substantially vertically oriented relative to an upper surface of a fluid in a containment area.

16. The high capacity suction strainer of claim 1 wherein the nested tubes are substantially horizontally oriented relative to an upper surface of a fluid in a containment area.

* * * * *

UNITED STATES PATENT AND TRADEMARK OFFICE
CERTIFICATE OF CORRECTION

PATENT NO.         : 8,877,054 B2
APPLICATION NO.    : 14/122551
DATED              : November 4, 2014
INVENTOR(S)        : Charles Andersen, Edward Wolbert and Nicholas Hawkins It is certified that error appears in the above-identified patent and that said Letters Patent is hereby corrected as shown below:

Claim 1, column 14, line 28, after "through" please delete "; and" and insert a -- . --.

Claim 1, column 14, please delete lines 29-32.

Signed and Sealed this
Twenty-eighth Day of June, 2016

Michelle K. Lee
*Director of the United States Patent and Trademark Office*